United States Patent
Okamoto et al.

(10) Patent No.: US 11,748,920 B2
(45) Date of Patent: Sep. 5, 2023

(54) IMAGE PROCESSING DEVICE, AND IMAGE PROCESSING METHOD

(71) Applicant: Nissan Motor Co., Ltd., Kanagawa (JP)

(72) Inventors: Mai Okamoto, Kanagawa (JP); Hiroyuki Kikuchi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/632,087

(22) PCT Filed: Aug. 2, 2019

(86) PCT No.: PCT/JP2019/030405
§ 371 (c)(1),
(2) Date: Feb. 1, 2022

(87) PCT Pub. No.: WO2021/024290
PCT Pub. Date: Feb. 11, 2021

(65) Prior Publication Data
US 2022/0319066 A1    Oct. 6, 2022

(51) Int. Cl.
*G01C 21/36*     (2006.01)
*G06T 11/00*     (2006.01)
(Continued)

(52) U.S. Cl.
CPC ............ *G06T 11/001* (2013.01); *G06T 5/002* (2013.01); *G06T 11/60* (2013.01); *G06T 2207/10024* (2013.01); *G06T 2207/30252* (2013.01)

(58) Field of Classification Search
CPC ....... G06T 11/001; G06T 5/002; G06T 11/60; G06T 2207/10024; G06T 2207/30252; G06T 7/90; G06T 7/40; G06T 2207/30268; G09G 5/02; G09G 5/04; G09G 5/10; G09G 2320/0626; G09G 2354/00; G09G 2360/11; G09G 2380/10; G09G 2380/08; G09G 2380/06; G09G 2370/16; G09G 2370/06; G09G 2370/025; G09G 3/2092;
(Continued)

(56) References Cited

U.S. PATENT DOCUMENTS 6,169,516 B1    1/2001  Watanabe et al.
8,243,994 B2 *  8/2012  Suzuki .................. H04N 5/247
                                              382/104
(Continued)

FOREIGN PATENT DOCUMENTS

EP    3076655 A1 * 10/2016    ......... G06K 9/00791
EP    3076655 A1   10/2016
(Continued)

*Primary Examiner* — Wesner Sajous
(74) *Attorney, Agent, or Firm* — Osha Bergman Watanabe & Burton LLP

(57) ABSTRACT

An image processing device includes: an information acquisition unit configured to acquire outside information including color information of outside of a vehicle; an image generation unit configured to generate, based on the outside information, a first image in which a difference in the color information with respect to the outside of the vehicle is within a predetermined range; and an output unit configured to output the first image to a display provided in a cabin of the vehicle.

17 Claims, 17 Drawing Sheets

(51) Int. Cl.
  *G06T 5/00* (2006.01)
  *H04N 7/18* (2006.01)
  *G06T 11/60* (2006.01)

(58) Field of Classification Search
  CPC .... G09G 3/20; B60K 35/00; B60K 2370/349; B60K 2370/152; B60K 2370/21; G02B 2027/0118; G02B 27/0101; B60Q 1/24; B60Q 1/2607; B60Q 1/50; B60Q 1/503; B60Q 1/52; B60Q 1/2615; B60Q 2300/45; B60Q 5/008; G09F 13/00; F21W 2102/40; B60R 11/04; B60R 11/02; B60R 2300/105; B60R 2300/303; G06V 20/56; H04B 17/318; H04N 1/60; H04N 1/6027; H04N 1/6041; H04N 1/6069; H04N 5/57; H04N 9/64; H04N 9/69; H04N 9/77
  USPC ........................................................ 345/589
  See application file for complete search history.

(56) References Cited

U.S. PATENT DOCUMENTS

| | | | | |
|---|---|---|---|---|
| 8,885,045 | B2 * | 11/2014 | Yanagi | B60R 1/00 348/148 |
| 10,300,856 | B2 * | 5/2019 | Baur | B60R 1/04 |
| 2006/0227138 | A1 * | 10/2006 | Oizumi | H04N 7/181 348/E7.086 |
| 2011/0063444 | A1 * | 3/2011 | Okamoto | G06V 20/58 348/148 |
| 2014/0085477 | A1 * | 3/2014 | Takano | B60R 25/305 348/148 |
| 2017/0186186 | A1 * | 6/2017 | Yamaguchi | G01C 21/28 |
| 2017/0230628 | A1 * | 8/2017 | Ichikawa | G09G 5/06 |
| 2020/0036948 | A1 * | 1/2020 | Song | B60W 50/0097 |
| 2021/0146962 | A1 * | 5/2021 | Kaji | B60W 40/08 |
| 2021/0146973 | A1 * | 5/2021 | Kuchar | B61L 15/0018 |
| 2022/0032843 | A1 * | 2/2022 | Lynam | B60R 11/04 |

FOREIGN PATENT DOCUMENTS

| | | |
|---|---|---|
| JP | H10221093 A | 8/1998 |
| JP | H11108684 A | 4/1999 |
| JP | 2003320869 A | 11/2003 |
| JP | 2004125446 A | 4/2004 |
| JP | 2008202987 A | 9/2008 |
| JP | 2016013747 A | 1/2016 |

* cited by examiner

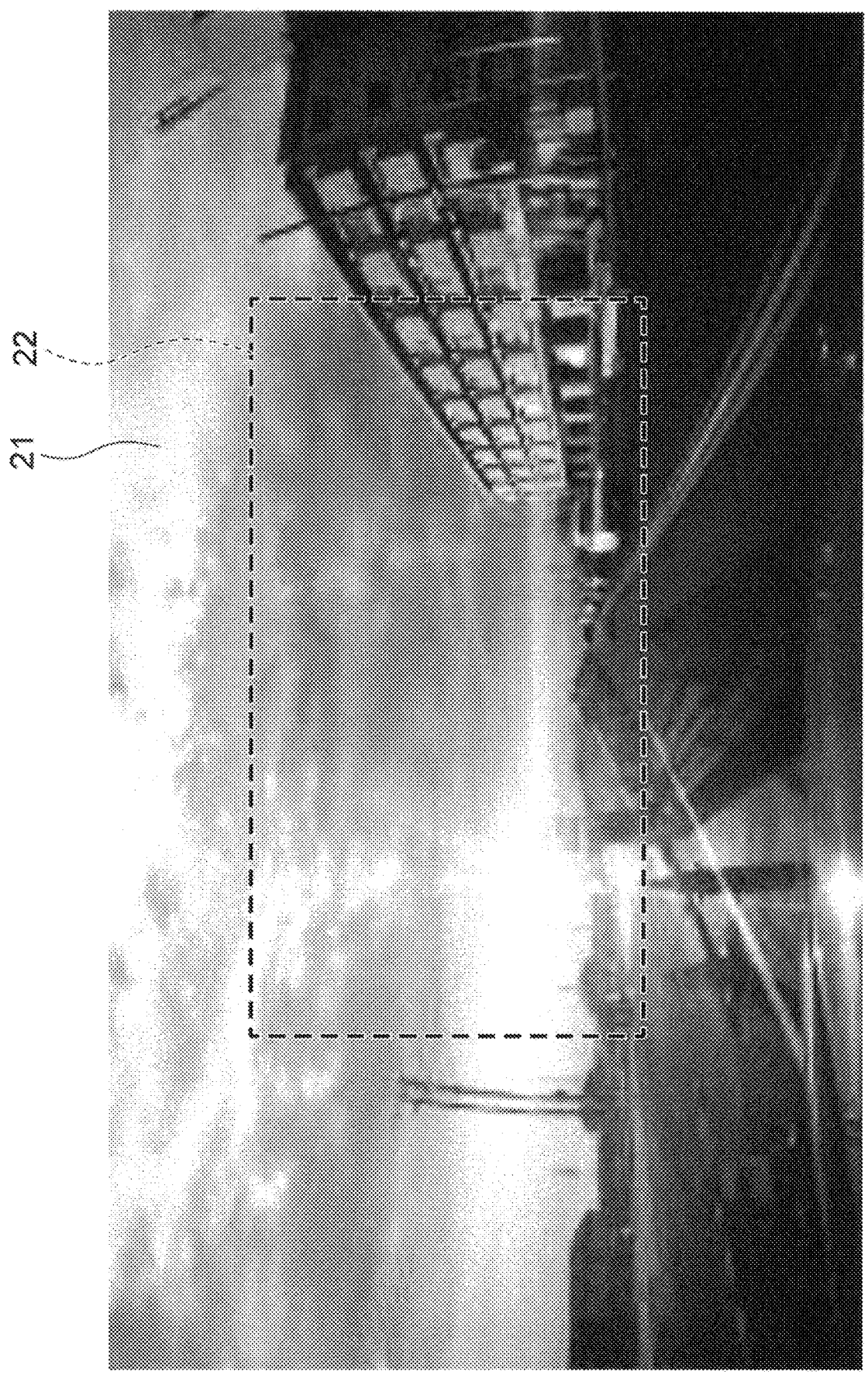

IMAGE PROCESSING DEVICE, AND IMAGE PROCESSING METHOD

TECHNICAL FIELD

The present invention relates to an image processing device and an image processing method.

BACKGROUND ART

A car navigation system including an imaging means, a storage means, a navigation control means, an image synthesis means, and a display is known (e.g., Patent Document 1). In this car navigation system, the imaging means captures images of scenery in the traveling direction of an automobile. The image synthesis means uses a live-action video, which is captured by the imaging means, for a background image and superposes navigation information elements on the background image to obtain a synthesized image. The display operates to display the synthesized image as a result of the image synthesis performed by the image synthesis means.

PRIOR ART DOCUMENT

[Patent Document]
[Patent Document 1] JP11-108684A

SUMMARY OF INVENTION

Problems to be Solved by Invention

In the above prior art, a part of the actual scenery is displayed on the display without any modification, and it is therefore difficult to give a visual sense of unity between the image displayed on the display and the scenery around the display. Thus, occupants of the vehicle may feel the presence of the display excessively, and the comfortable feeling given to the occupants may be impaired.

A problem to be solved by the present invention is to provide an image processing device and an image processing method capable of improving the comfortable feeling given to the occupants of a vehicle.

Means for Solving Problems

The present invention solves the above problem through acquiring outside information including color information of the outside of a vehicle, generating, based on the outside information, a first image in which a difference in the color information with respect to the outside of the vehicle is within a predetermined range, and outputting the first image to a display provided in the cabin of the vehicle.

Effect of Invention

According to the present invention, the presence of the display felt by the occupants can be reduced and it is therefore possible to improve the comfortable feeling given to the occupants.

BRIEF DESCRIPTION OF DRAWINGS

FIG. 4A is a diagram for describing a method of generating the first image.

MODE(S) FOR CARRYING OUT THE INVENTION

Hereinafter, embodiments of the image processing device and image processing method according to the present invention will be described with reference to the drawings.

First Embodiment

Figure 1:
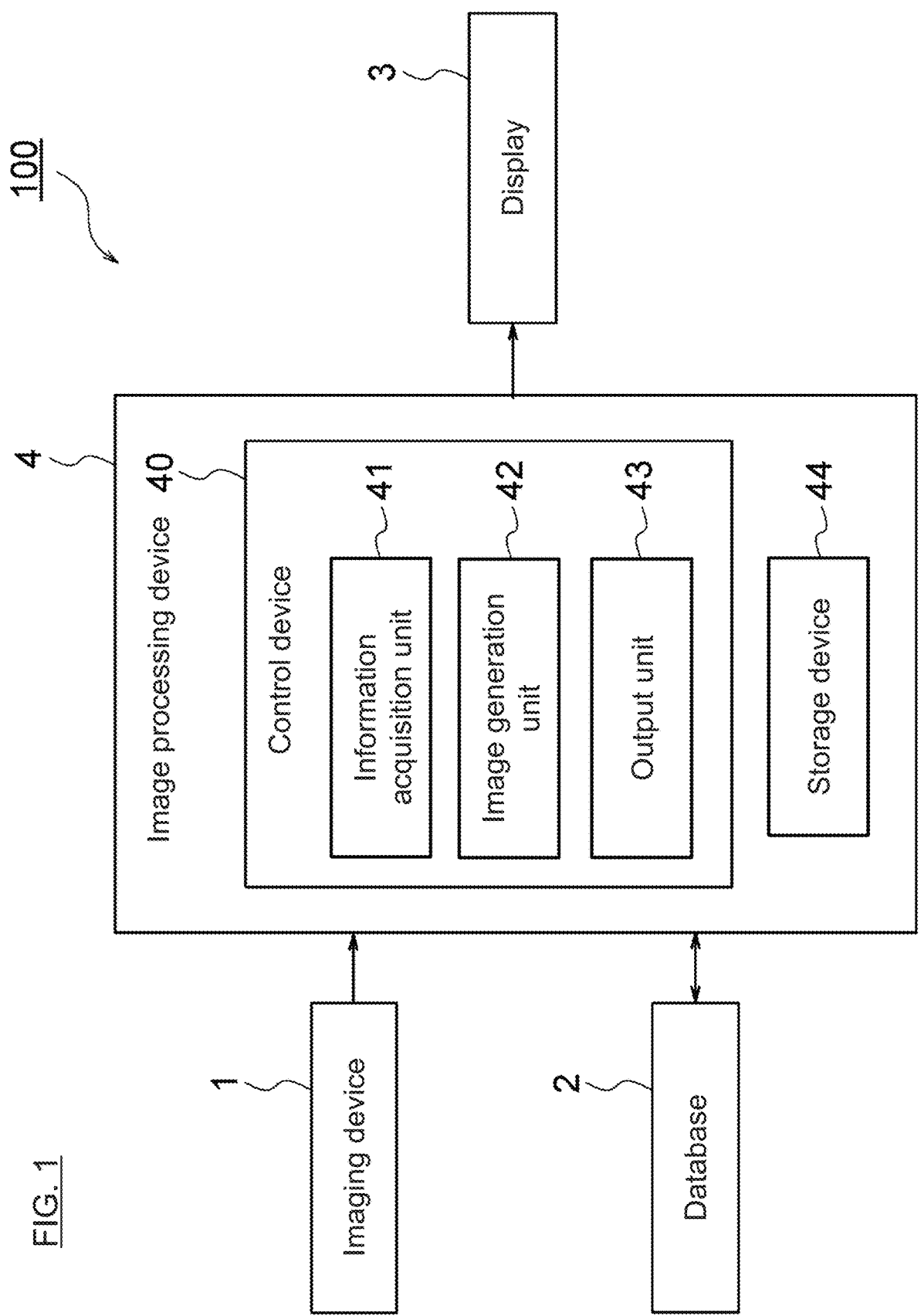
FIG. 1 is a block diagram illustrating an example of an image display system including the image processing device according to a first embodiment.

The present embodiment will be described by exemplifying an image processing device equipped in a vehicle. FIG. 1 is a block diagram illustrating an example of an image display system 100 including an image processing device 4 according to the first embodiment. As illustrated in FIG. 1, the image display system 100 in the present embodiment includes an imaging device 1, a database 2, a display 3, and the image processing device 4. The system of the present embodiment is a system that controls the display 3 to display an image generated by the image processing device 4. One or more occupants of the vehicle can use the system of the present embodiment to visually recognize the image, which is generated by the image processing device 4, through the display 3.

In the present embodiment, the occupants of the vehicle refer to persons who are onboard the vehicle, and the positions of seats in which the occupants sit are not particularly limited. The number of occupants of the vehicle is also not particularly limited, and the image display system 100 in the present embodiment presents the image generated by the image processing device 4 to one or more occupants.

The vehicle equipped with the image processing device 4 will then be described. In the present embodiment, the vehicle is, for example, a general automobile that is equipped with a navigation system and driven by a person.

Alternatively, the vehicle may be, for example, an automobile that is equipped with a navigation system and has a function of controlling travel control (speed control and steering control) in an automated or autonomous manner and that is driven by a person. Alternatively, the vehicle may be, for example, an automobile that is equipped with a navigation system and has a function of controlling travel control (speed control and steering control) in an automated or autonomous manner and that is driven without a driver.

In the present embodiment, the power source of the vehicle is not particularly limited. The vehicle may be an electric automobile that travels using electricity as the energy source and a motor as the power source. Alternatively, the vehicle may be a gasoline-powered vehicle that travels using a gasoline engine as the power source. Alternatively, the vehicle may be an electric hybrid vehicle that has an engine and a motor as the power sources. The present embodiment will be described with reference to an example in which the vehicle is an electric automobile that requires external charging.

Each configuration included in the image display system 100 illustrated in FIG. 1 will then be described. The imaging device 1 is a device that captures an image of the outside of the vehicle. The outside of the vehicle means at least a part of the area around the vehicle. Examples of the imaging device 1 include a front camera that is provided at the front of the vehicle and captures an image ahead of the vehicle. The captured image reflects a part of the outside of the vehicle. The captured image captured by the imaging device 1 is output to the image processing device 4. The following description will be made for an exemplary case in which the imaging device 1 is the above front camera. However, the imaging device 1 is not limited to the front camera and may include side cameras that are provided at the sides of the vehicle and capture images laterally from the vehicle. The captured images in this case also reflect a part of the outside of the vehicle. Additionally or alternatively, the imaging device 1 may include a rear camera that is provided at the rear of the vehicle and captures an image behind the vehicle. The captured image in this case also reflects a part of the outside of the vehicle.

The imaging device 1 sequentially captures images of scenery ahead of the vehicle (also referred to as a forward view from the vehicle) and outputs a captured image to the image processing device 4 each time the image is captured. For example, the imaging device 1 captures an image of the scenery ahead of the vehicle at a predetermined cycle. By sequentially capturing images in this way, even when the scenery varies ahead of the vehicle in accordance with the time slot, weather, and location, the imaging device 1 can capture an image of the scenery ahead of the vehicle corresponding to the time slot, weather, and location. This allows the image processing device 4, which will be described later, to acquire color information of the outside of the vehicle corresponding to the time slot, weather, and location.

The imaging device 1 captures an image of the scenery in the traveling direction of the vehicle. The scenery captured by the imaging device 1 is scenery which an occupant of the vehicle visually recognizes through a window provided at the front of the vehicle. In the present embodiment, it is preferred to provide the imaging device 1 at a position with consideration for the field of view from an occupant of the vehicle. For example, when the occupant sits in a front seat of the vehicle, the occupant visually recognizes, through the front window, the lane in which the vehicle travels, road structures provided around the lane, other vehicles traveling around the vehicle, and other scenery and the like. It is preferred to provide the imaging device 1 at a position from which all the objects exemplified above can be imaged. The imaging device 1 is provided at such a position thereby to allow the imaging device 1 to capture the images of objects which the occupants of the vehicle visually recognize.

The database 2 is a database that stores image information. The image information stored in the database 2 includes an image of the interior portion of the vehicle. The image of the interior portion is, for example, an image including information on at least one of the color, material, and pattern of the surface of the interior portion. The image of the interior portion may be an image that imitates at least one of the color, material, and pattern of the surface of the interior portion or may also be an image obtained by capturing the image of the interior portion. In the present embodiment, the interior portion of the vehicle is an instrument panel provided at the front of the vehicle. The database 2 stores the image of the instrument panel. The database 2 stores the image of the instrument panel, for example, for each vehicle type and for each interior color in one vehicle type.

The database 2 outputs a designated image out of a plurality of stored images to the image processing device 4 in accordance with a command from the image processing device 4.

The display 3 is equipment that presents an image to the occupants of the vehicle. In the present embodiment, the display 3 is provided in a place that is easily visible to the occupant who sits in a front seat of the vehicle. The shape of the display 3 is not particularly limited, but the present embodiment will be described for an exemplary case in which the shape of the display 3 is a rectangular shape.

A display image is input to the display 3 from the image processing device 4. The display 3 displays the display image which is input from the image processing device 4. The display 3 updates the image to be displayed every time a display image is input from the image processing device 4. In the following description, for descriptive purposes, the image which is displayed on the display 3 and visually recognized by the occupants of the vehicle will be referred to as a display image.

The display image is composed of a background image and content information. Specifically, one display image is formed by superposing the content information on the background image and the formed image is displayed. The content information refers to an image that represents general information to be provided to the occupants of the vehicle, and the type of information is not particularly limited. Examples of the content information include a speedometer of the vehicle, an operation screen of the navigation system, and a screen indicating a state of the vehicle. The content information may also be an icon or a character. The display image input from the image processing device 4 will be described later.

Figure 2:
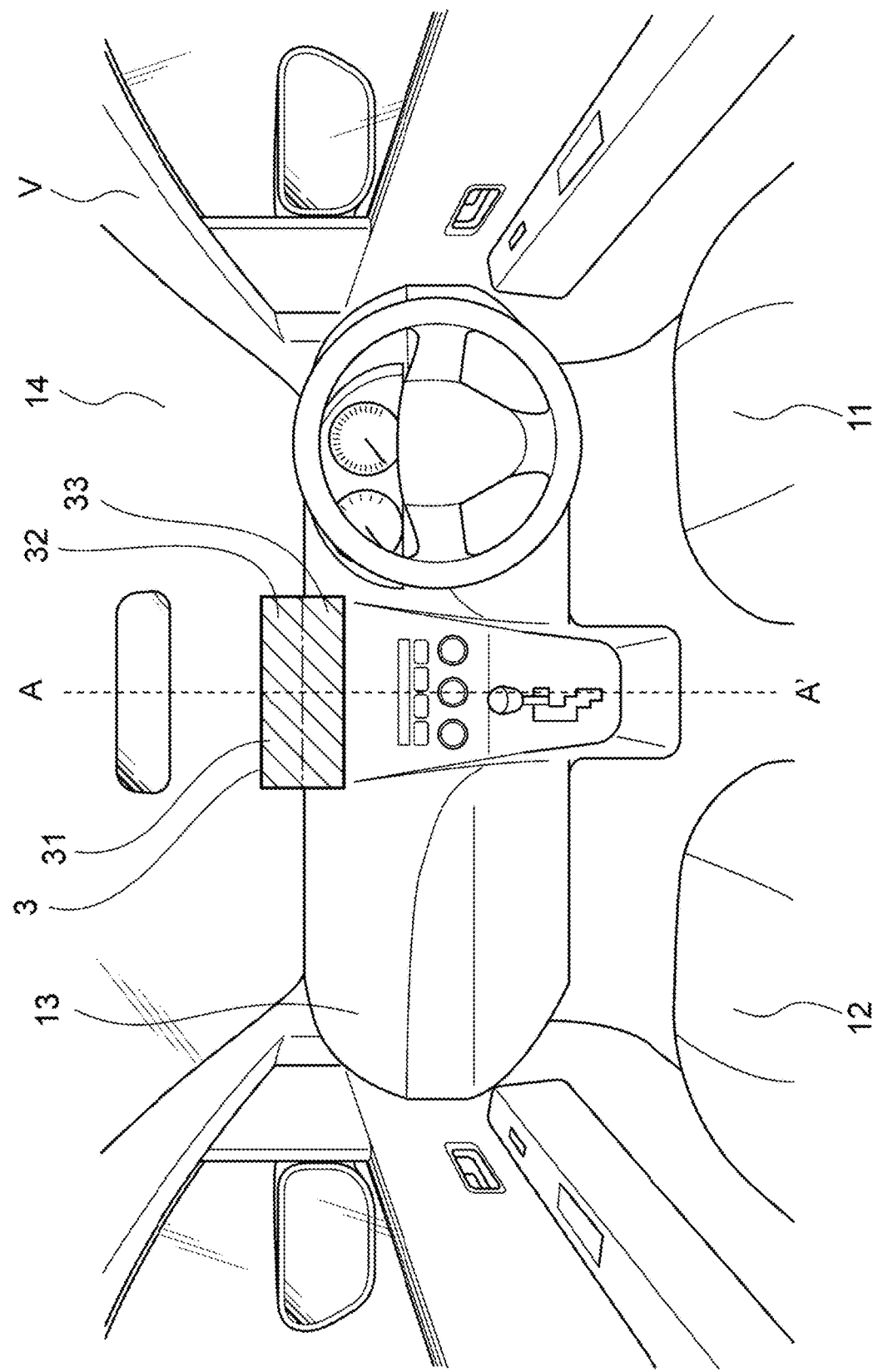
FIG. 2 illustrates an example of a display.

FIG. 2 illustrates an example of the display 3 according to the present embodiment. FIG. 2 illustrates the cabin of a vehicle V. In the example of FIG. 2, the display 3 is a display having a rectangular shape. The size of the display 3 is not particularly limited. For example, the display 3 has a size at least to such an extent that the operation screen of the navigation system is displayed. The display 3 has a display area 31 that is an area for displaying the display image. The size of the display area 31 is determined by the structure of the display 3. For example, when the edge portion between the end portion of the display 3 and the display area 31 is relatively thin, the display area 31 has approximately the same size as that of the display 3. The present embodiment will be described for a case in which the shape of the display 3 and the shape of the display area 31 are the same, but the shape of the display 3 and the shape of the display area 31 may be different.

The display 3 is provided at a position that is easy for the occupants who sit in a driver seat 11 and a front passenger seat 12 of the vehicle V to visually recognize. In the example of FIG. 2, the display 3 is arranged such that a part of the display area 31 of the display 3 extends in the direction from an interior portion 13 of the vehicle V to a window 14. The window 14 is a so-called windshield and is provided at the front of the vehicle V. In the present embodiment, the display 3 is provided along the lower end of the window 14. In other words, the display 3 is provided near the lower end of the window 14 and in parallel with the extending direction of the lower end of the window 14.

For example, the display 3 may be provided at a height at which the height of the upper end of the display 3 and the height of the lower end of the window 14 match (approximately match) each other. In this case, when the driver visually recognizes the scenery ahead of the vehicle V through the window 14, the display 3 can be reliably prevented from interfering with the driver's field of view regardless of the height of the driver's eyes (also referred to as the eye point). Alternatively, the display 3 may be provided at a height at which the lower end of the window 14 is positioned between the upper and lower ends of the display 3. In this case, in the driver's field of view, the lower end of the window 14 and the upper end of the display 3 are visually recognized at close positions, and the driver is easily under an illusion as if the window 14 and the display 3 are continuous.

In the present embodiment, the display 3 is mounted on the surface of the interior portion 13. The interior portion 13 of the vehicle V is the instrument panel. The surface of the interior portion 13 of the vehicle V is painted with one or more predetermined colors. In the present embodiment, the color of the interior portion 13 is not particularly limited. In the present embodiment, the material constituting the surface of the interior portion 13 of the vehicle V is also not particularly limited. The surface of the interior portion 13 of the vehicle V may have a pattern of the material itself (e.g., wood grain). The display 3 is not limited to being mounted on the surface of the interior portion 13 and may otherwise be embedded in the interior portion 13. In this case, the display 3 is arranged such that a part of the display area projects from the interior portion 13 toward the window 14.

As illustrated in FIG. 2, the display area 31 is composed of a first area 32 that is an area on the window 14 side and a second area 33 that is an area on the interior portion 13 side as compared with the first area 32. In other words, the first area 32 and the second area 33 are each a part of the display area 31, and the first area 32 is positioned on the window 14 side as compared with the second area 33. The image display system 100 of the present embodiment displays different background images in the first area 32 and the second area 33 thereby to display a background image in the display area 31 as a whole. The images displayed in the first area 32 and the second area 33 will be described later.

Figure 3:
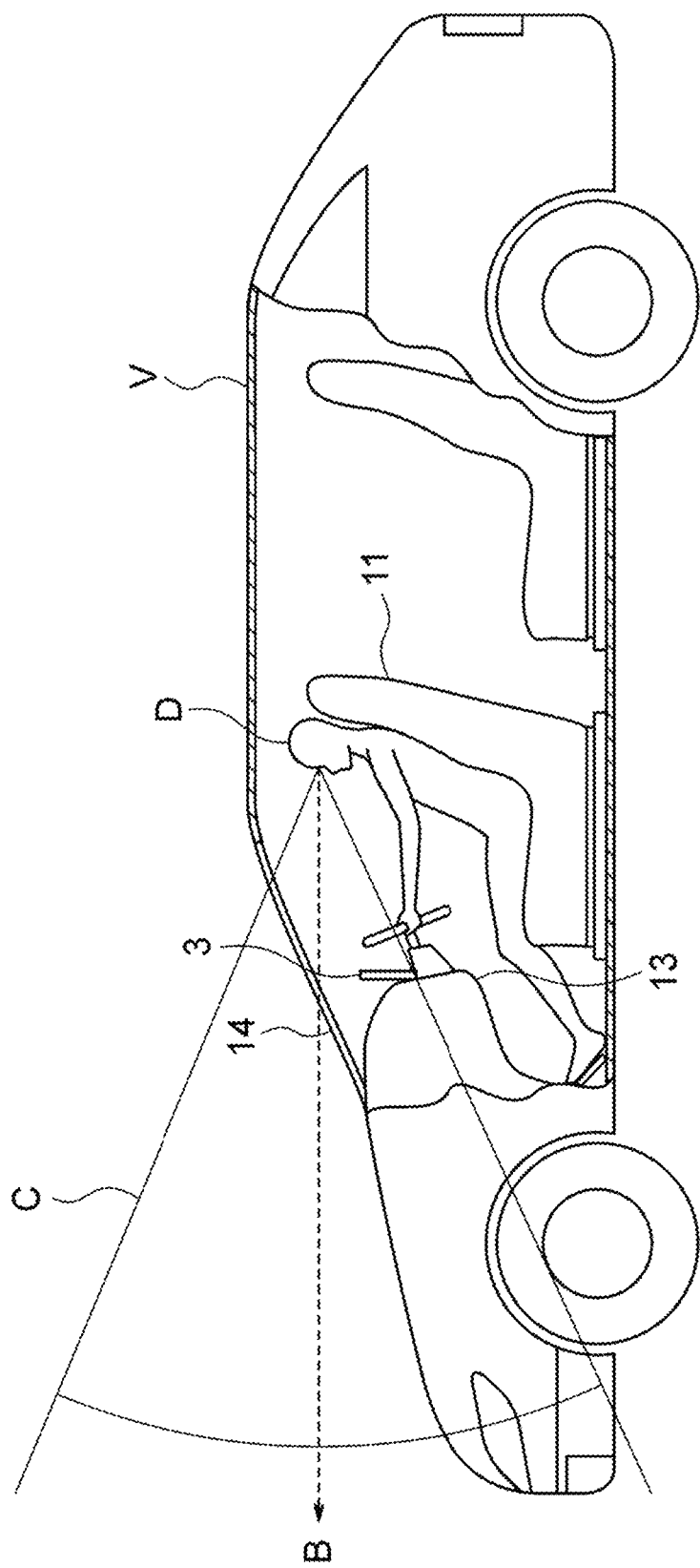
FIG. 3 is a diagram for describing the relationship between the position of the display and the visual field of an occupant.

FIG. 3 is a diagram for describing the relationship between the position of the display 3 and the visual field of an occupant. FIG. 3 is a cross-sectional view taken along the line A-A' illustrated in FIG. 2. As illustrated in FIG. 3, a driver D of the vehicle V sits in the driver seat 11 to drive the vehicle V. Reference character C illustrated in FIG. 3 schematically represents the vertical visual field in the visual field of the driver D. The visual field C of the driver D is a visual field when the driver D visually recognizes the scenery in a direction B. The direction B is the traveling direction of the vehicle V. That is, FIG. 3 illustrates a scene in which the driver D is driving while looking at the traveling direction of the vehicle V through the window 14.

As illustrated in FIG. 3, the display 3 is provided in a place included in the visual field C of the driver D. More specifically, the display area 31 (see FIG. 2) of the display 3 is included in the visual field C of the driver D. In other words, the first area 32 (see FIG. 2) and the second area 33 (see FIG. 2) are included in the visual field C of the driver D. By providing the display 3 in such a place, the angle required for the driver D to move the line of sight from the traveling direction of the vehicle V to the display 3 is reduced; therefore, the load applied to the driver D during the drive can be suppressed, and the comfortable feeling given to the driver D is improved.

On the other hand, when the display 3 is provided in the place illustrated in FIG. 3, the driver D inevitably cares about the presence of the display 3 because the display 3 is included in the visual field C of the driver D. Therefore, for example, when a display image irrelevant to the forward view from the vehicle V, such as a guidance screen of the navigation system, is displayed on the display 3, the driver D who is looking at the traveling direction of the vehicle V may worry about the presence of the display 3 included in the visual field C. In this case, the driver D may feel the presence of the display 3 excessively, and the comfortable feeling given to the driver D may be impaired. In this context, the image processing device 4 according to the present embodiment can reduce the presence of the display 3 using the following method even when the display 3 is provided in a place that is easy for the driver D to visually recognize.

Referring again to FIG. 1, the configuration of the image display system 100 will be described. The image processing device 4 is composed of a computer provided with hardware and software. Specifically, the image processing device 4 is composed of a read only memory (ROM) that stores programs, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. A control device 40 illustrated in FIG. 1 corresponds to the CPU, and a storage device 44 illustrated in FIG. 1 corresponds to the ROM and RAM.

As illustrated in FIG. 1, the control device 40 includes an information acquisition unit 41, an image generation unit 42, and an output unit 43. These blocks achieve respective functions, which will be described below, by the software established in the ROM.

The function of the information acquisition unit 41 will be described. The information acquisition unit 41 acquires outside information including color information of the outside of the vehicle and interior portion information that is color information of the interior portion of the vehicle.

In the present embodiment, the color information refers to numerical data indicating a color. An example of the method of indicating a color adopts an RGB color mode. The color in the RGB color mode can be indicated by how much each element of red (R), green (G), and blue (B) is included. For example, when the brightness of each element of red, green, and blue is represented by an 8-bit (1-byte) decimal number, (0, 0, 0) indicates black, (255, 255, 255) indicates white, (255, 0, 0) indicates red, (0, 255, 0) indicates green, and (0, 0, 255) indicates blue (numerals in parentheses indicate respective brightnesses of R, G, and B elements in this order from left).

The outside information acquired by the information acquisition unit 41 will then be described. The information acquisition unit 41 acquires from the imaging device 1 a captured image in which the forward view from the vehicle is captured, and acquires color information of the outside of the vehicle from the captured image. For example, the information acquisition unit 41 executes image processing on the captured image thereby to acquire the color information in pixel units of the captured image. Then, the information acquisition unit 41 calculates the average value of the color information of the entire captured image thereby to acquire the color information of the forward view from the vehicle. This allows the color information to be acquired for the scenery which the occupants of the vehicle visually recognize. For example, when the vehicle is traveling in the sunset, the color information in the entire captured image is dominated by orange, which is the color of the sunset. In this case, the information acquisition unit 41 acquires the numerical data indicating orange as the color information of the forward view from the vehicle.

The information acquisition unit 41 acquires the captured image captured by the imaging device 1 at a predetermined cycle. This allows the color information to be acquired for the forward view from the vehicle in accordance with the scene in which the vehicle travels. The predetermined cycle is a cycle that is preliminarily set.

The interior portion information will then be described. The information acquisition unit 41 acquires an image of the instrument panel of the vehicle from the database 2 and acquires the color information of the interior portion of the vehicle from the image of the instrument panel. For example, the information acquisition unit 41 executes image processing on the image of the instrument panel thereby to acquire the color information of the interior portion of the vehicle. When the surface of the instrument panel of the vehicle has a wood grain pattern, for example, the color information of the interior portion is dominated by beige, which is the color of the wood grain. In this case, the information acquisition unit 41 acquires numerical data indicating beige as the color information of the interior portion of the vehicle.

The function of the image generation unit 42 will then be described. The image generation unit 42 generates a first image and a second image that serve as background images in the display image. The first image refers to an image displayed in the first area of the display area of the display 3. The second image refers to an image displayed in the second area of the display area of the display 3, which is different from the first area. The first area refers to an area on the window side in the display area of the display 3 (e.g., the first area 32 of FIG. 2). The second area refers to an area on the interior portion side of the vehicle in the display area of the display 3 as compared with the first area (e.g., the second area 33 of FIG. 2). The present embodiment will be described on the assumption that the sizes of the first and second images are the same, but the sizes of the first and second images may be different. In other words, the sizes of the first and second areas may be the same or different.

In the present embodiment, the display area of the display 3 is divided into the first and second areas, and the size of the background image is therefore the size of an area obtained by adding the first and second areas. The image generation unit 42 generates the background image through combining the first and second images and processing the first and second images. Then, the image generation unit 42 superposes the content information on the background image thereby to generate the display image. A specific method of generating each image will be described below.

Figure 4B:
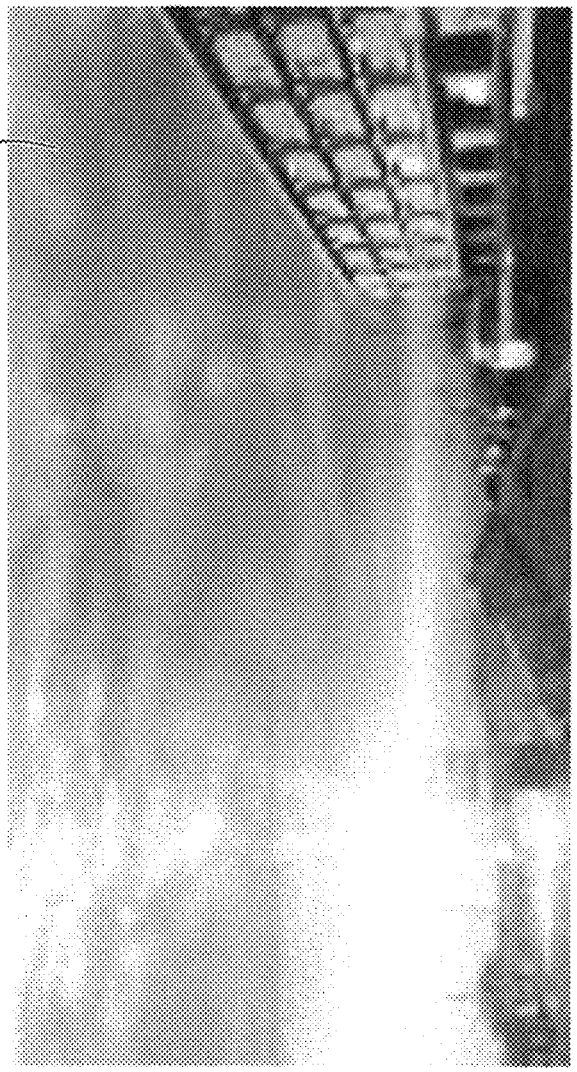
FIG. 4B is a diagram for describing the method of generating the first image.
Figure 4C:
FIG. 4C is a diagram for describing the method of generating the first image.

A method of generating the first image will be described with reference to FIGS. 4A to 4C. FIGS. 4A to 4C are diagrams for describing a method of generating the first image. As illustrated in FIG. 4A, the image generation unit 42 acquires a captured image 21 captured by the imaging device 1. The image generation unit 42 performs the processing treatment, which will be described below, on the image corresponding to the timing at which the information acquisition unit 41 acquires the captured image captured by the imaging device 1. The image generation unit 42 extracts the image of a target range 22 corresponding to the first area from the captured image 21.

Here, the image generation unit 42 regards the forward view from the vehicle captured in the captured image 21 as an actual forward view from the vehicle and presumes an area that is actually difficult for an occupant of the vehicle to visually recognize due to the presence of the display 3 in the forward view from the vehicle. For example, the image generation unit 42 presumes, based on the positional relationship between the visual field of an occupant of the vehicle and the display 3, an area that is actually difficult for the occupant to visually recognize due to the presence of the display 3. The image generation unit 42 specifies the presumed area as the target range 22. Through this operation, the image based on the forward view from the vehicle, which is actually difficult for the occupant to visually recognize because the image is captured behind the display 3, can be adopted as the first image, which will be described below. As a result, it is possible to reduce the possibility that a difference in color information larger than a predetermined range occurs between the forward view from the vehicle and the first image.

FIG. 4B illustrates a target image 23 extracted by the image generation unit 42. The target image 23 is an image of the target range 22 in the captured images 21 illustrated in FIG. 4A.

FIG. 4C illustrates a first image 24 generated by the image generation unit 42. The image generation unit 42 performs processing treatment on the target image 23 thereby to generate the first image 24. Specifically, the image generation unit 42 performs a blurring process on the target image 23 based on the outside information acquired by the information acquisition unit 41.

For example, the image generation unit 42 sets the level of the blurring process such that the difference with respect to the color information of the forward view from the vehicle is within a predetermined range. The predetermined range is a range that is preliminarily set. The level of the blurring process represents the magnitude of the difference between the original image and the blurred image. For example, the blurring process to be adopted may be a processing method in which the difference in color information from the original image increases as the level of the blurring process increases. In this case, the image generation unit 42 corrects the color information of the target image in accordance with the magnitude of the blurring level. By displaying on the display 3 an image in which the image of the actual scenery is blurred, it is possible to avoid noises as compared with the case in which the image of the actual scenery is displayed. Moreover, the color information is different from that of the actual scenery, and it is therefore possible to reduce the possibility that an occupant of the vehicle is distracted by the image as compared with the case in which the image of the actual scenery is displayed. As a result, it is possible to reduce the possibility that the driver's driving operation is hindered. The image processing device 4 can appropriately borrow and use an image processing technique for the blurring process known at the time of filing the present application. The blurring process to be adopted may be a processing method in which the image is processed so that the difference in color information from the original image is fixed (or approximately fixed) regardless of the level of the blurring process.

Figure 5:
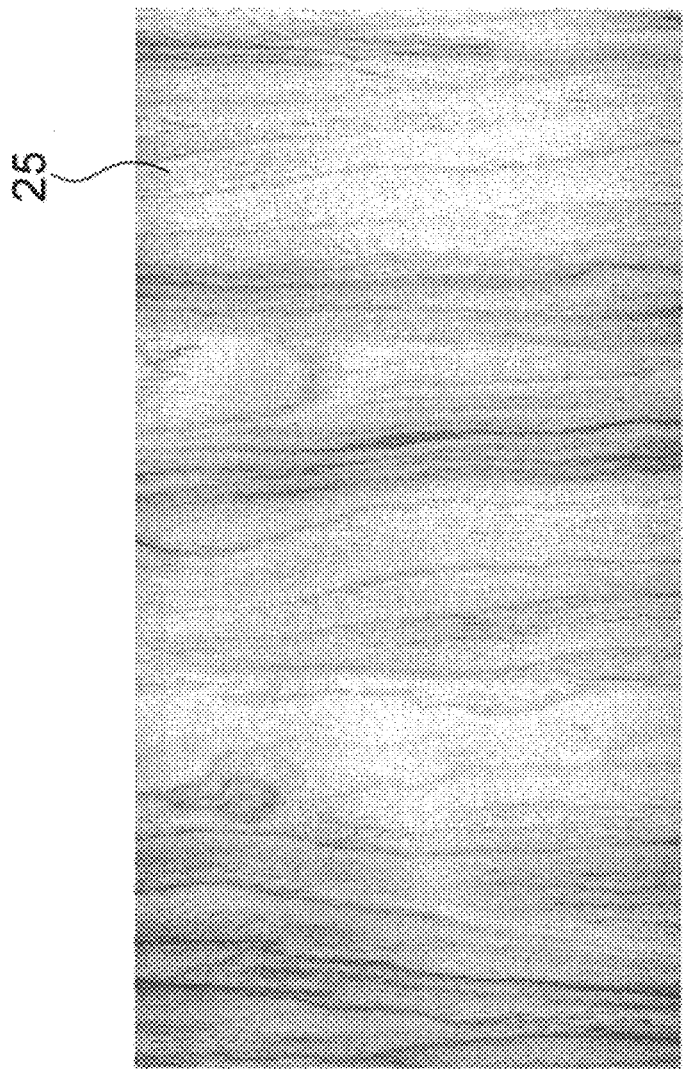
FIG. 5 illustrates an example of a second image.

A method of generating the second image will then be described with reference to FIG. 5. FIG. 5 illustrates an example of the second image. In the present embodiment, the image generation unit 42 acquires an image of the instrument panel of the vehicle from the database 2 and adopts the acquired image as the second image. Here, the image generation unit 42 extracts an image of the target range corresponding to the second area from the images stored in the database 2 and adopts the image corresponding to the size of the second area as the second image. In the example of FIG. 5, the instrument panel of the vehicle equipped with the image processing device 4 has a wood grain pattern, and the image generation unit 42 therefore generates a second image 25 having a wood grain pattern.

Figure 6A:
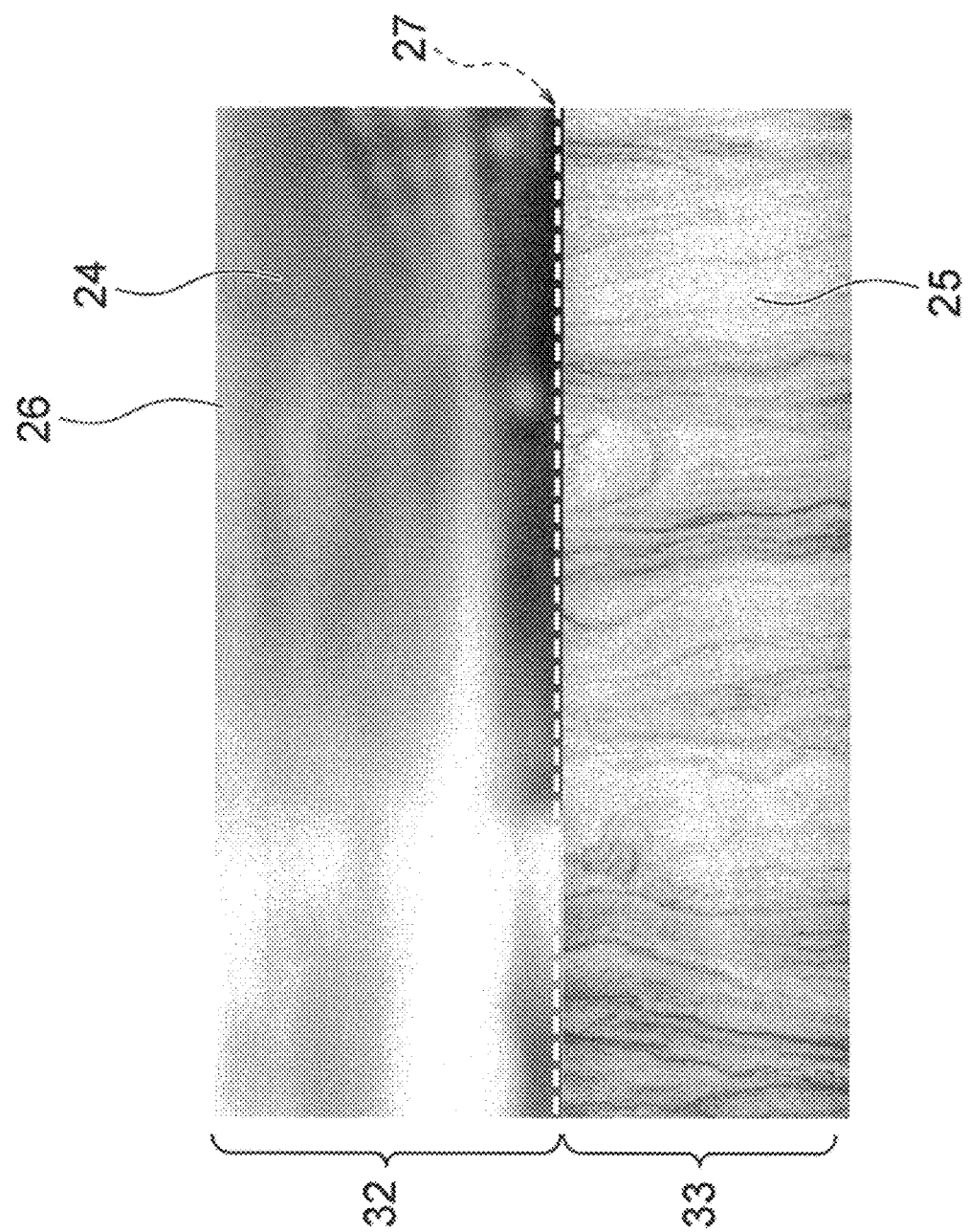
FIG. 6A is a diagram for describing a method of generating a background image.
Figure 6B:
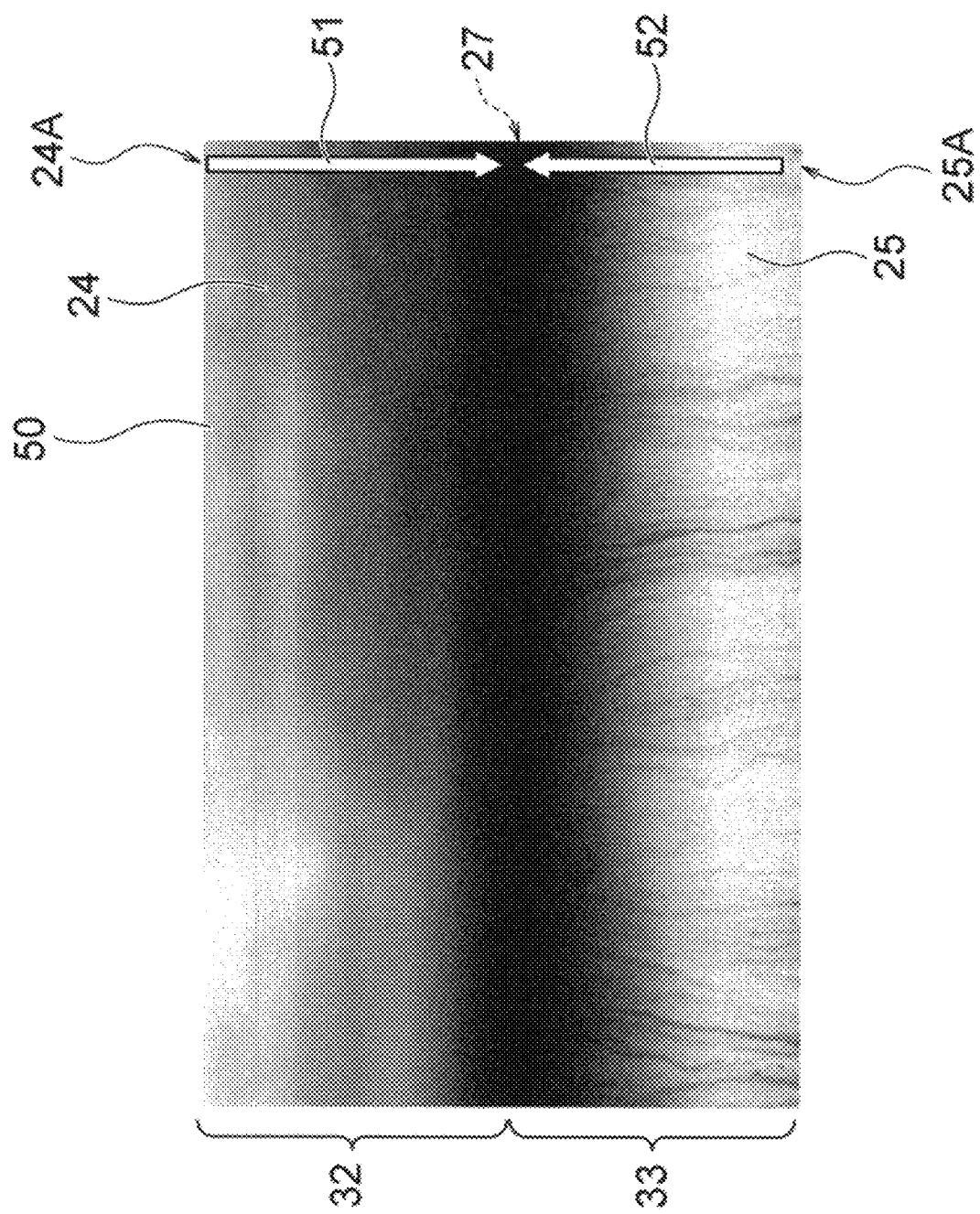
FIG. 6B is a diagram for describing the method of generating the background image.
Figure 6C:
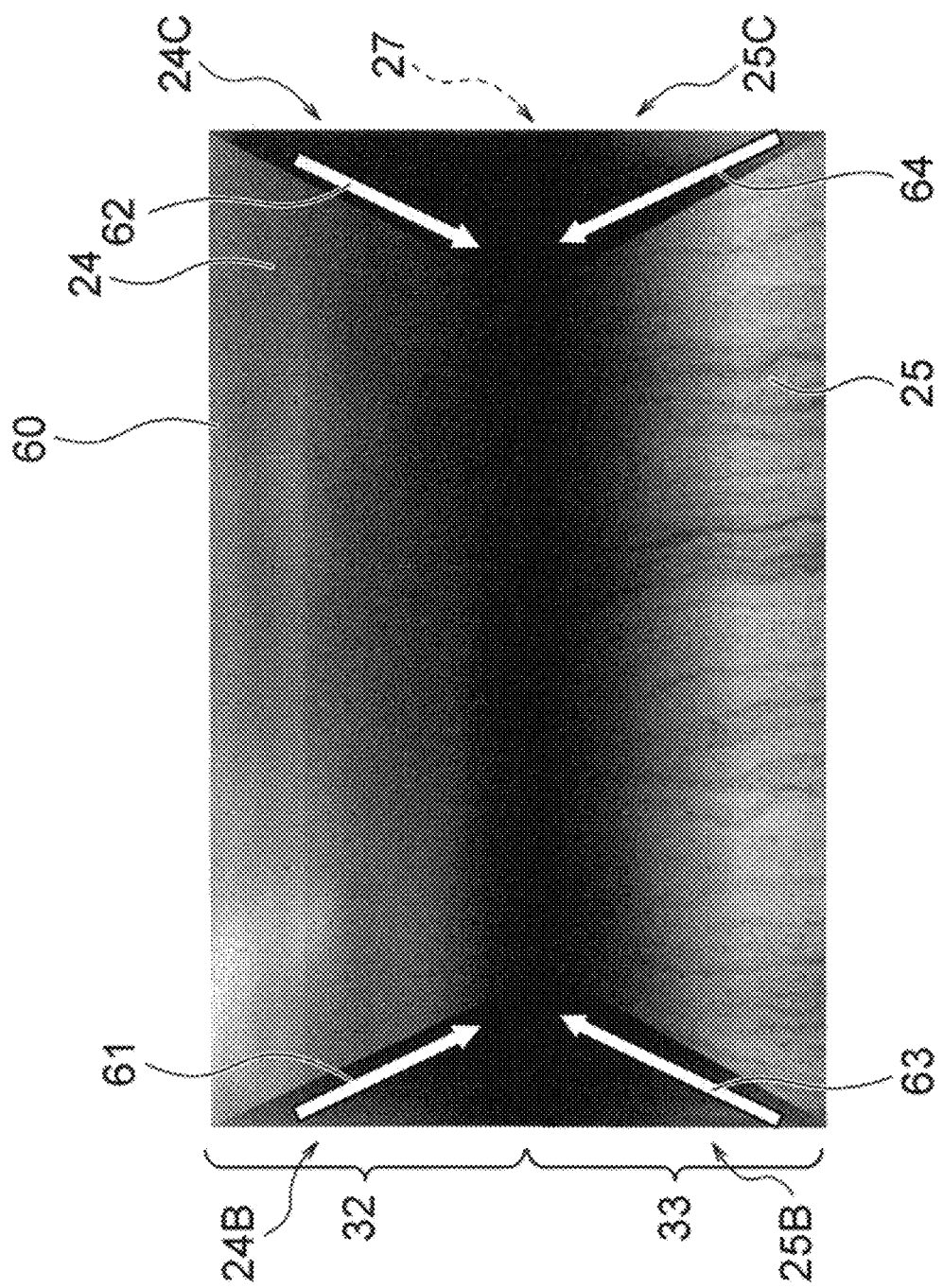
FIG. 6C is a diagram for describing the method of generating the background image.

A method of generating a background image will then be described with reference to FIGS. 6A to 6C. FIGS. 6A to 6C are diagrams for describing a method of generating a background image. As illustrated in FIG. 6A, the image generation unit 42 connects the end portion of the first image 24 on the interior portion 13 side with the end portion of the second image 25 on the window 14 side thereby to generate a combined image 26. The first image 24 illustrated in FIG. 6A corresponds to the first image 24 illustrated in FIG. 4C, and the second image 25 illustrated in FIG. 6A corresponds to the second image 25 illustrated in FIG. 5. In FIG. 6A, the first area 32 corresponds to the first area 32 illustrated in FIG. 2, and the second area 33 corresponds to the second area 33 illustrated in FIG. 2. In FIG. 6A, reference numeral 27 represents a boundary between the first area 32 and the second area 33. When the display area 31 of the display 3 has a rectangular shape and the sizes of the first area 32 and second area 33 are the same as illustrated in FIG. 6A, for example, the boundary 27 is the center line (straight line) which divides the display area 31 into the first area 32 and the second area 33.

The image generation unit 42 generates a background image through combining the first and second images with each other and then performing the processing treatment on the combined image.

In the present embodiment, the image generation unit 42 performs a gradation process on the first and second images in the vertical direction. The vertical direction refers to a direction from the upper part to the lower part of the vehicle or a direction from the lower part to the upper part. The orientation of the direction in the vertical direction is not limited. A background image 50 illustrated in FIG. 6B is the background image in which the image generation unit 42 performs the gradation process on the combined image 26 of FIG. 6A in the vertical direction.

For example, the image generation unit 42 performs a process of applying the gradation to the first image 24 so that it gradually becomes black from an end portion 24A of the first image 24 toward the boundary 27. Specifically, the image generation unit 42 corrects the color information of the first image 24 along the direction of an arrow 51 illustrated in FIG. 6B so that the numerical data indicating the color gradually becomes the numerical data indicating black at the boundary 27. The arrow 51 indicates the direction from the window 14 illustrated in FIG. 2 to the interior portion 13.

Likewise, for example, the image generation unit 42 performs a process of applying the gradation to the second image 25 so that it gradually becomes black from an end portion 25A of the second image 25 toward the boundary 27. Specifically, the image generation unit 42 corrects the color information of the second image 25 along the direction of an arrow 52 illustrated in FIG. 6B so that the numerical data indicating the color gradually becomes the numerical data indicating black at the boundary 27. The arrow 52 indicates the direction from the interior portion 13 illustrated in FIG. 2 to the window 14.

The image generation unit 42 performs the gradation process on the first and second images in the vertical direction and then performs the gradation process on the processed images in the horizontal direction.

The horizontal direction refers to a direction in the vehicle from the left side of the vehicle to the right side of the vehicle or a direction from the right side of the vehicle to the left side of the vehicle. The orientation of the direction in the horizontal direction is not limited. A background image 60 illustrated in FIG. 6C is the background image in which the image generation unit 42 performs the gradation process on the background image 50 of FIG. 6B in the horizontal direction.

For example, the image generation unit 42 performs a process of applying the gradation to the first image 24 so that it gradually becomes black from end portions 24B and 24C of the first image 24 toward the boundary 27. Specifically, the image generation unit 42 corrects the color information of the first image 24 along the direction of an arrow 61 illustrated in FIG. 6C so that the numerical data indicating the color gradually becomes the numerical data indicating black at the boundary 27. In addition, the image generation unit 42 corrects the color information of the first image 24 along the direction of an arrow 62 illustrated in FIG. 6C so that the numerical data indicating the color gradually becomes the numerical data indicating black at the boundary 27.

Likewise, for example, the image generation unit 42 performs a process of applying the gradation to the second image 25 so that it gradually becomes black from end portions 25B and 25C of the second image 25 toward the boundary 27. Specifically, the image generation unit 42 corrects the color information of the second image 25 along the direction of an arrow 63 illustrated in FIG. 6C so that the numerical data indicating the color gradually becomes the numerical data indicating black at the boundary 27. In addition, the image generation unit 42 corrects the color information of the second image 25 along the direction of an arrow 64 illustrated in FIG. 6C so that the numerical data indicating the color gradually becomes the numerical data indicating black at the boundary 27.

The image processing described with reference to FIGS. 6A to 6C is performed thereby to generate the background image 60 composed of the first and second images which are subjected to the gradation process in the vertical and horizontal directions as illustrated in FIG. 6C. By applying such gradation, it is possible to obtain an effect that an occupant of the vehicle feels the depth when visually recognizing the background image 60. In other words, the background image 60 can be generated as a three-dimensional image by applying the gradation in the vertical and horizontal directions.

The process of applying the gradation described with reference to FIGS. 6B and 6C is an example and is not particularly limited. The image processing device 4 can appropriately borrow and use an image processing technique for applying gradation known at the time of filing the present application.

Figure 7:
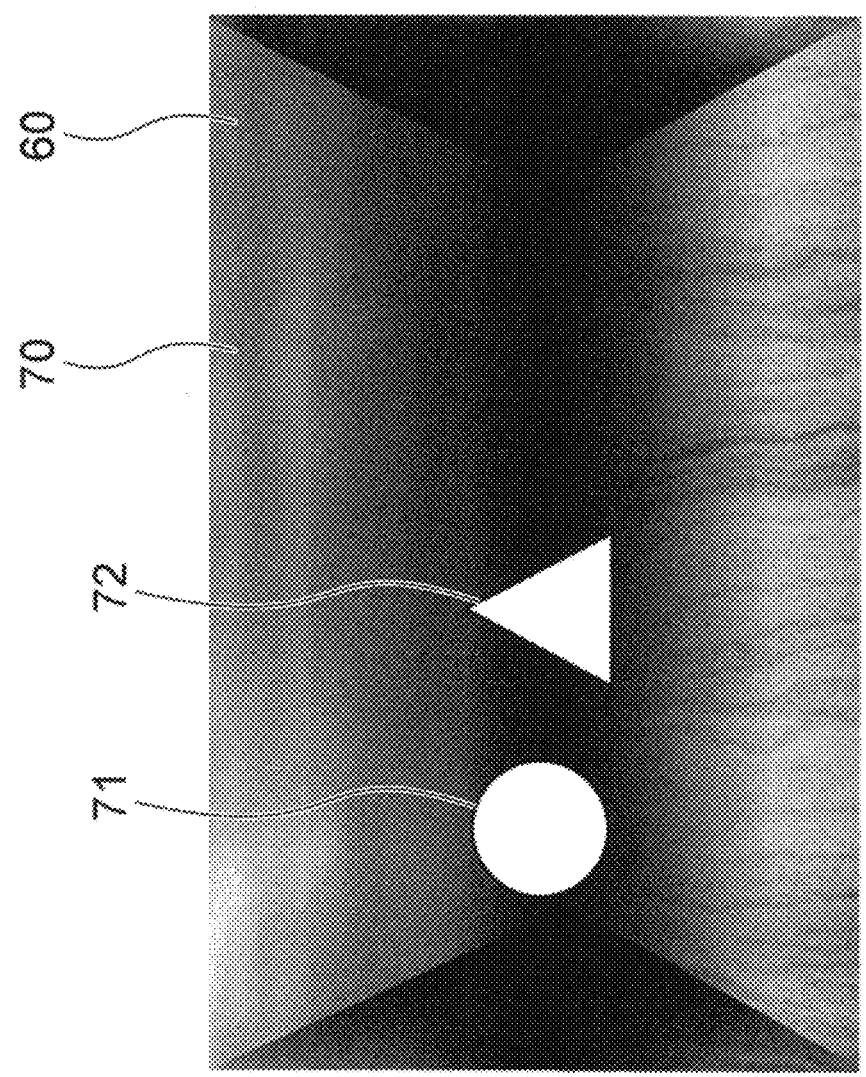
FIG. 7 is a diagram for describing a method of generating a display image.

A method of generating a display image will then be described with reference to FIG. 7. FIG. 7 is a diagram for describing a method of generating a display image. As illustrated in FIG. 7, the image generation unit 42 superposes content information items 71 and 72 on the background image 60 thereby to generate a display image 70. Reference numerals 71 and 72 illustrated in FIG. 7 schematically represent respective content information items, and the display form and display content of the content information are not particularly limited. For example, the content information 71 is a screen representing a speedometer of the vehicle. Likewise, for example, the content information 72 is a screen representing a state of the vehicle.

Referring again to FIG. 1, the function of another block constituting the control device 40 will be described. The output unit 43 outputs the display image generated by the image generation unit 42 to the display 3. The first and second images are also included in the display image, so the output unit 43 outputs the first and second images to the display 3. This allows the display 3 to display the display image.

Figure 8:
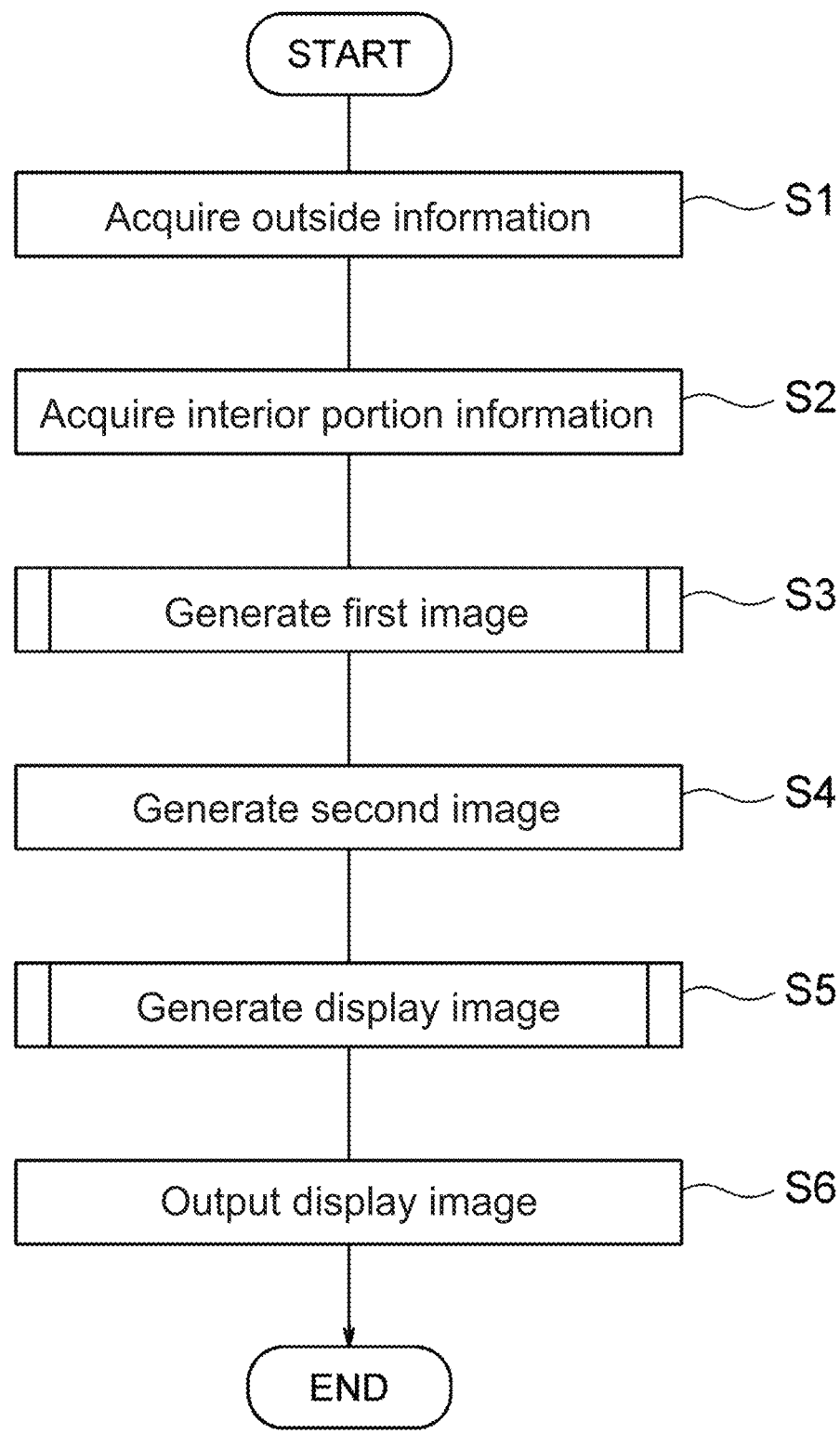
FIG. 8 is a flowchart illustrating a process executed by the image processing device according to the first embodiment.

The description will now be made with reference to FIGS. 8 to 10 for a process executed by the image processing device 4 in the image display system 100 which displays the display image on the display 3. FIG. 8 is a flowchart illustrating a process executed by the image processing device 4.

In step S1, the image processing device 4 acquires the outside information including the color information of the outside of the vehicle. For example, the image processing device 4 acquires from the imaging device 1 a captured image of the forward view from the vehicle. The image processing device 4 executes the image processing on the captured image thereby to acquire the color information of the entire captured image.

In step S2, the image processing device 4 acquires the interior portion information including the color information of the interior portion of the vehicle. For example, the image processing device 4 acquires an image of the instrument panel of the vehicle from the database 2. The image processing device 4 executes the image processing on the image of the instrument panel thereby to acquire the color information of the interior portion of the vehicle. In this step, the image processing device 4 also acquires information on the shape of the display 3, the position at which the display 3 is provided in the cabin of the vehicle, and the size of the display area of the display 3. This allows the image processing device 4 to recognize the sizes of the first and second areas and the position of the boundary between the first and second areas.

In step S3, the image processing device 4 generates the first image to be displayed in the first area. FIG. 9 illustrates a subroutine of step S3 illustrated in FIG. 8.

In step S31, the image processing device 4 extracts a target image having the size corresponding to the first area from the captured image of the forward view from the vehicle. For example, the image processing device 4 presumes, based on the positional relationship between the visual field of an occupant of the vehicle and the display 3, an area that is actually difficult for the occupant to visually recognize because the area is hidden by the display 3. Then, the image processing device 4 extracts, from the captured image of the forward view from the vehicle, an image of the presumed area as the target image. Examples of the target image include the target image 23 illustrated in FIG. 4B.

In step S32, the image processing device 4 executes, based on the outside information acquired in step S1, the blurring process on the target image extracted in step S31. For example, the image processing device 4 sets the level of the blurring process such that the difference with respect to the color information of the forward view from the vehicle is within a predetermined range. The image processing device 4 corrects the color information of the target image in accordance with the set level.

In step S33, the image processing device 4 adopts the target image, in which the captured image is blurred by the process of step S32, as the first image. Examples of the first image include the first image 24 illustrated in FIG. 4C.

Figure 9:
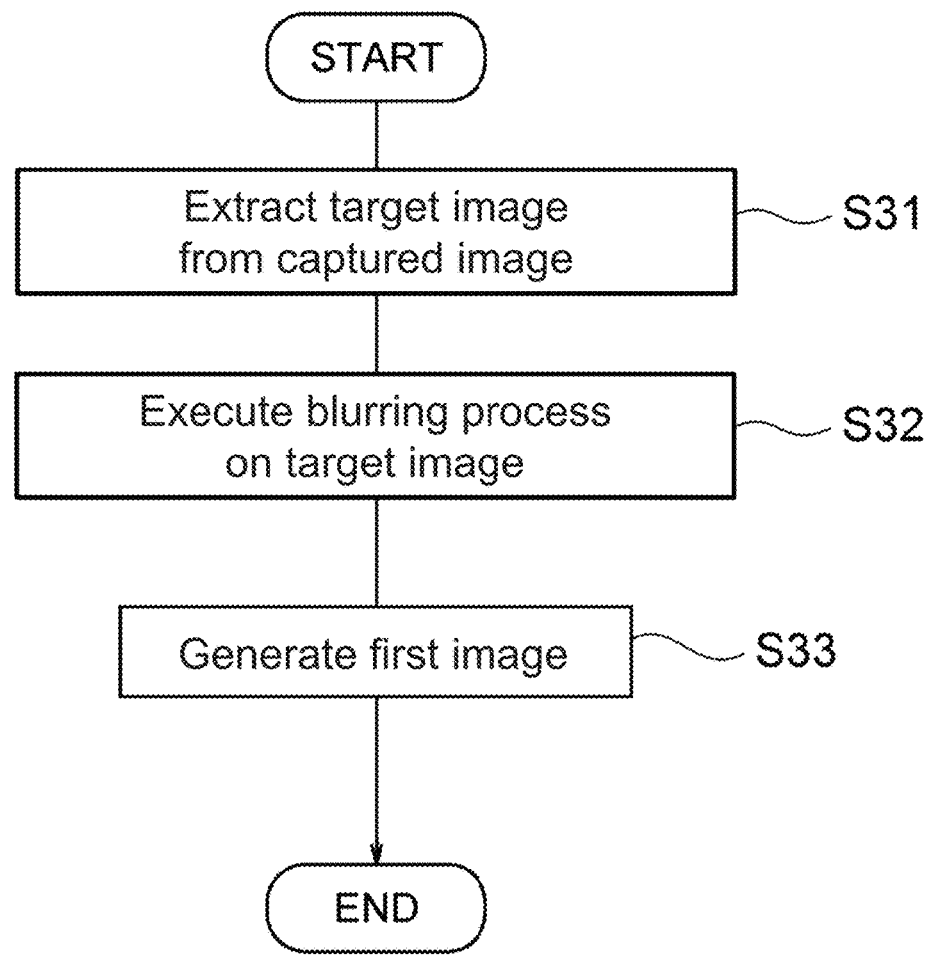
FIG. 9 illustrates a subroutine of step S3 illustrated in FIG. 8.
Figure 10:
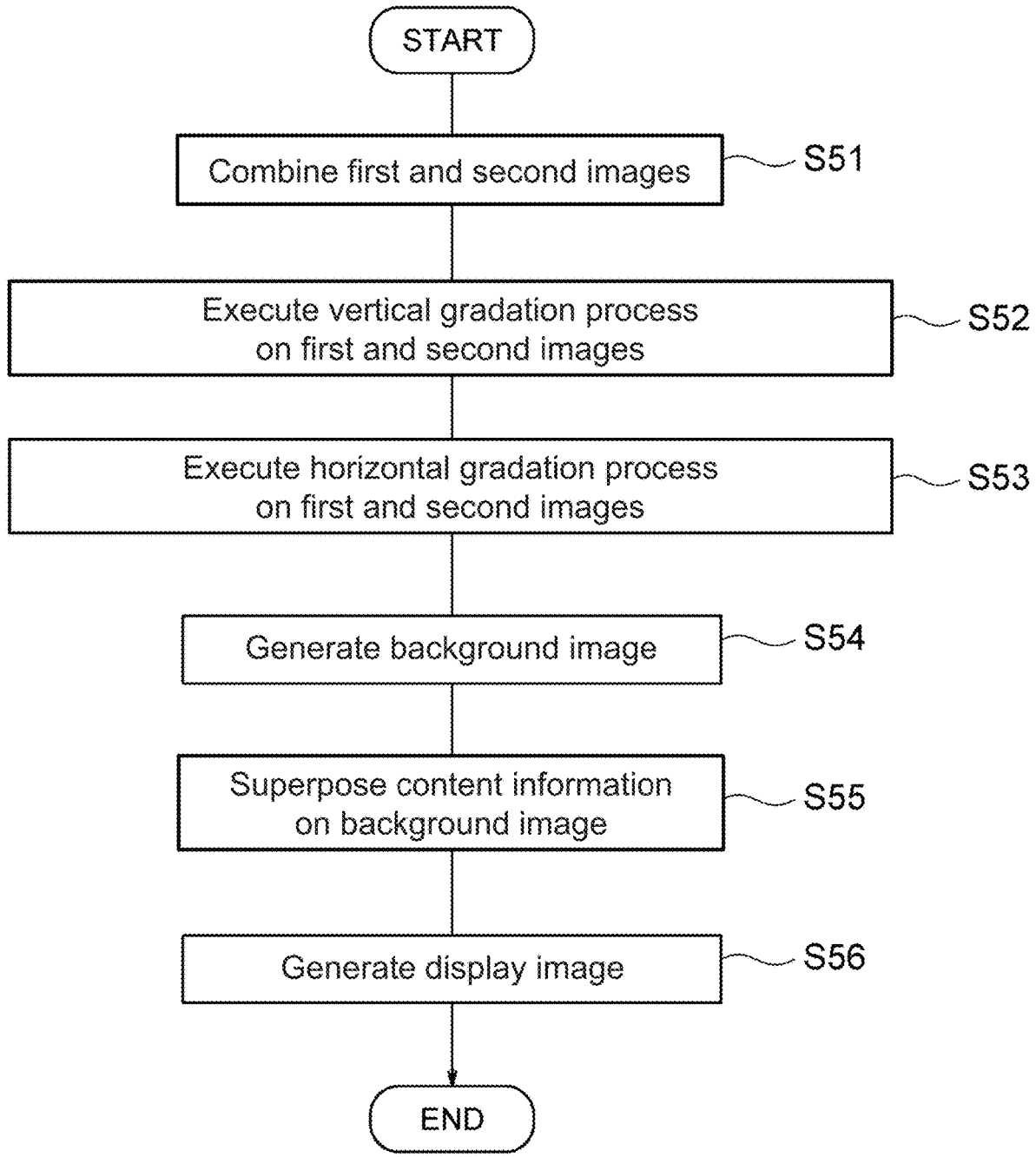
FIG. 10 illustrates a subroutine of step S5 illustrated in FIG. 8.

After the first image is generated in step S33, the process exits the subroutine illustrated in FIG. 9 and proceeds to step S4 illustrated in FIG. 8.

In step S4, the image processing device 4 generates the second image. In the present embodiment, the image processing device 4 acquires an image of the instrument panel of the vehicle from the database 2 and adopts the acquired image as the second image. Examples of the second image include the second image 25 illustrated in FIG. 5.

In step S5, the image processing device 4 generates, based on the first image generated in step S3 and the second image generated in step S4, the display image to be displayed in the display area of the display 3. FIG. 10 illustrates a subroutine of step S5 illustrated in FIG. 8.

In step S51, the image processing device 4 combines the first image generated in step S3 with the second image generated in step S4. For example, the image processing device 4 connects the end portion of the first image on the vehicle's interior portion side and the end portion of the second image on the vehicle's front window side. This allows a combined image to be generated, in which the first and second images are combined in this order along the direction from the upper part to the lower part of the vehicle. Examples of the combined image include the combined image 26 illustrated in FIG. 6A.

In step S52, the image processing device 4 executes a process of applying the vertical gradation to the image generated in step S51. For example, the image processing device 4 performs a process of applying the gradation to the first image so that it gradually becomes black from the end portion of the first image on the window side toward the boundary between the first and second images. In addition, for example, the image processing device 4 performs a process of applying the gradation to the second image so that it gradually becomes black from the end portion of the second image on the interior portion side toward the boundary between the first and second images. Examples of the image subjected to the vertical gradation process include the background image 50 illustrated in FIG. 6B.

In step S53, the image processing device 4 executes a process of applying the horizontal gradation to the image processed in step S52. For example, the image processing device 4 performs a process of applying the gradation to the first and second images so that they gradually become black from the end portions other than the end portion of the first image on the window side and the end portion of the second image on the interior portion side toward the boundary between the first and second images. Examples of the image subjected to the horizontal gradation process include the background image 60 illustrated in FIG. 6C.

By performing the processes of steps S51 to S53, the background image based on the first and second images is generated in step S54.

In step S55, the image processing device 4 superposes the content information on the background image generated in step S54. For example, the image processing device 4 superposes a guidance screen for navigation on the background image. Examples of the image on which the content information is superposed include the display image 70 illustrated in FIG. 7.

By performing the process of step S55, the display image is generated in step S56. After the display image is generated in step S56, the process exits the subroutine illustrated in FIG. 10 and proceeds to step S6 illustrated in FIG. 8.

In step S6, the image processing device 4 outputs the display image generated in step S5 to the display 3. After the process of step S6 is completed, the image processing device 4 concludes the processing.

Figure 11:
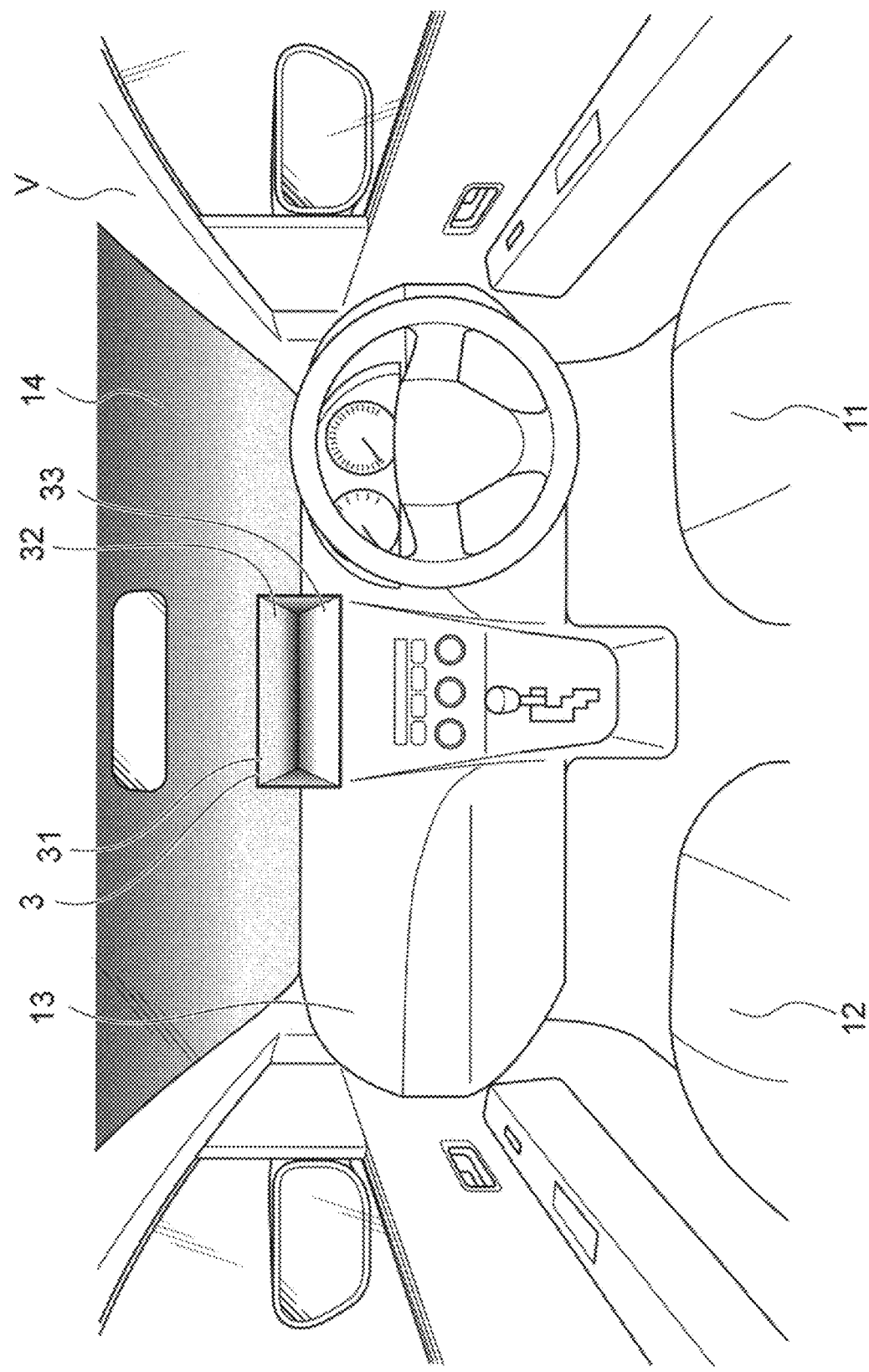
FIG. 11 illustrates an example of a scene in which the background image generated by the image processing device is displayed on a display.

FIG. 11 illustrates an example of a scene in which the background image generated by the image processing device 4 is displayed on the display 3. FIG. 11 corresponds to FIG. 2 illustrating the cabin of the vehicle. For example, the scene illustrated in FIG. 11 is a scene in which the vehicle V is traveling in the sunset time slot. In the first area 32 of the display 3, an image (first image) is displayed in which the orange color, or the color of the sunset, is the dominant color and the forward view from the vehicle V is blurred. In the second area 33 of the display 3, an image (second image) of the interior portion 13 is displayed. In addition, the first and second images are provided with the gradation in the vertical and horizontal directions so that an occupant of the vehicle can feel the depth. Such a background image is displayed on the display 3, and an occupant of the vehicle V is thereby easily under an illusion as if the interior portion 13 is present in the place in which the display 3 actually exists. Moreover, an occupant of the vehicle V is easily under an illusion as if the forward view from the vehicle V is present above the interior portion 13. The occupant of the vehicle V is easily under an illusion and it is thereby possible to reduce the presence of the display 3 felt by the occupant of the vehicle V.

As described above, the image processing device 4 according to the present embodiment comprises: the information acquisition unit 41 that acquires the outside information including the color information of the outside of the vehicle; the image generation unit 42 that generates, based on the outside information, the first image 24 in which the difference in the color information with respect to the outside of the vehicle is within a predetermined range; and the output unit 43 that outputs the first image 24 to the display 3 provided in the cabin of the vehicle. This allows a visual sense of unity to be given between the first image displayed on the display 3 and the scenery around the display 3. An occupant of the vehicle is easily under an illusion as if the first image and the scenery of the outside of the vehicle are in one unified scenery, and it is possible to reduce the presence of the display felt by the occupant of the vehicle. As a result, the comfortable feeling given to the occupant of the vehicle can be improved.

Moreover, in the present embodiment, the first image 24 is displayed in the first area 32 which is a part of the display area 31 of the display 3. This allows a visual sense of unity to be given between a part of the display 3 and the scenery around the display 3, and it is possible to reduce the presence of the display 3 felt by an occupant of the vehicle.

Furthermore, in the present embodiment, the display 3 is configured such that a part of the display area 31 extends in a direction from the interior portion 13 of the vehicle to the window 14 of the vehicle, and the first area 32 is positioned on the window 14 side. Through this configuration, when an occupant of the vehicle visually recognizes the outside of the vehicle through the window, the occupant is easily under an illusion as if the scenery around the first area and the first image displayed in the first area are in one unified scenery as a whole. As a result, it is possible to reduce the presence of the display 3 felt by the occupant of the vehicle.

In addition, in the present embodiment, the display 3 is provided in a place in which the first area 32 is included in the visual field of an occupant of the vehicle when the occupant visually recognizes the outside of the vehicle through the window 14. Through this configuration, even when the display 3 is provided in a place that is easy for an occupant of the vehicle to visually recognize as illustrated in FIG. 2, the presence of the display 3 can be reduced. For example, when a guidance screen of the navigation system is displayed as the content information on the display 3, the occupant of the vehicle can easily concentrate on the information from the navigation system rather than caring about the presence of the display 3. As a result, the comfortable feeling given to the occupant of the vehicle can be improved.

Moreover, in the present embodiment, the display 3 is provided ahead of an occupant of the vehicle, and the information acquisition unit 41 acquires the outside information ahead of the vehicle. This allows the occupant to easily recognize the first image as a part of the scenery in the traveling direction of the vehicle, and the presence of the display 3 felt by the occupant can be reduced.

Furthermore, in the present embodiment, the information acquisition unit 41 acquires a captured image of the outside of the vehicle captured by the imaging device 1, and the information generation unit 42 performs processing treatment based on the outside information thereby to generate the first image 24. This allows the first image to be generated based on the color information of the actual scenery. As a result, it is possible to easily give a visual sense of unity between the first image and the scenery around the display 3.

In addition, in the present embodiment, the processing treatment which the image generation unit 42 performs on the captured image is a process of blurring the captured image. This allows the first image to be generated in which the difference in color shade is smaller than that of the actual scenery, and the occupant's line of sight therefore tends to be directed toward the vehicle's window 14 side on which the actual scenery is reflected. As a result, for example, the possibility of hindering the occupant's driving operation can be reduced.

Moreover, in the present embodiment, the information acquisition unit 41 sequentially acquires the captured image ahead of the vehicle, and the image generation unit 42 performs the processing treatment on the captured image corresponding to the timing at which the captured image is acquired. Through this operation, even when the scenery varies ahead of the vehicle due to the change in the travel scene of the vehicle, it is possible to generate the first image corresponding to the scenery ahead of the vehicle. As a result, the presence of the display 3 felt by an occupant can be reduced regardless of the travel scene of the vehicle.

Furthermore, in the present embodiment, the image generation unit 42 generates the second image 25 displayed in the second area 33 of the display area 31, which is different from the first area 32, and the output unit 43 outputs the second image 25 to the display 3. Through this operation, for example, the second image having a color tone different than that of the first image can be displayed in one display 3 together with the first image.

In addition, in the present embodiment, the second area 33 is positioned on the interior portion 13 side as compared with the first area. 32. Through this configuration, for example, an image matching the color tone of the interior portion 13 of the vehicle can be displayed as the second image, and as a result, the interior portion 13 and the second image can be easily given a visual sense of unity.

Moreover, in the present embodiment, the display 3 is provided in a place in which the second area 33 is included in the visual field of an occupant of the vehicle when the occupant visually recognizes the outside of the vehicle through the window 14. Through this configuration, even when the display 3 is provided in a place that is easy for the occupant of the vehicle to visually recognize as illustrated in FIG. 2, the presence of the display 3 can be reduced.

Furthermore, in the present embodiment, the second image 25 is an image that represents the surface of the interior portion 13. This allows the interior portion 13 and the second image to be given a visual sense of unity, and the presence of the display 3 felt by an occupant of the vehicle can be reduced.

In addition, in the present embodiment, the display 3 is a display in which the display area 31 has a rectangular shape, and the image generation unit 42 performs a process of applying gradation to the first image 24 and the second image 25 so that they gradually become black from the end portion on the window 14 side and the end portion on the interior portion 13 side of the display area 31 toward the boundary 27 between the first area 32 and the second area 33. Then, the output unit 43 outputs the first image 24 and the second image 25 subjected to the gradation process to the display 3. The difference in the numerical data indicating the color becomes small around the boundary between the first and second images, and therefore, when the image of the surface of the interior portion 13 is displayed as the second image, an occupant of the vehicle is easily under an illusion as if the interior portion 13 has its depth. As a result, the presence of the display 3 felt by the occupant can be reduced.

Moreover, in the present embodiment, the image generation unit 42 performs the process of applying gradation to the first image 32 and the second image 33 so that they gradually become black from end portions other than the end portion on the window 14 side and the end portion on the interior portion 13 side in the display area 31 toward the boundary 27 between the first area 32 and the second area 33. Through this operation, when the image of the surface of the interior portion 13 is displayed, for example, an occupant of the vehicle is easily under an illusion as if the interior portion 13 has its depth. As a result, the presence of the display 3 felt by the occupant can be reduced.

Furthermore, in the present embodiment, the image generation unit 42 superposes the content information 71, 72 on the first image 24 and the second image 25 thereby to generate the display image 70 to be displayed in the display area 31, and the output unit 43 outputs the display image on the display 3. The content information 71, 72 is information to be provided to an occupant of the vehicle. Through this operation, the presence of the first image 24 and the second image 25, which serve as background images, allows the content information to be presented to the occupant while reducing the presence of the display 3 felt by the occupant. As a result, the occupant is easily under an illusion as if the content information is displayed in the space, and the occupant can be given an unusual feeling.

Second Embodiment

Figure 12:
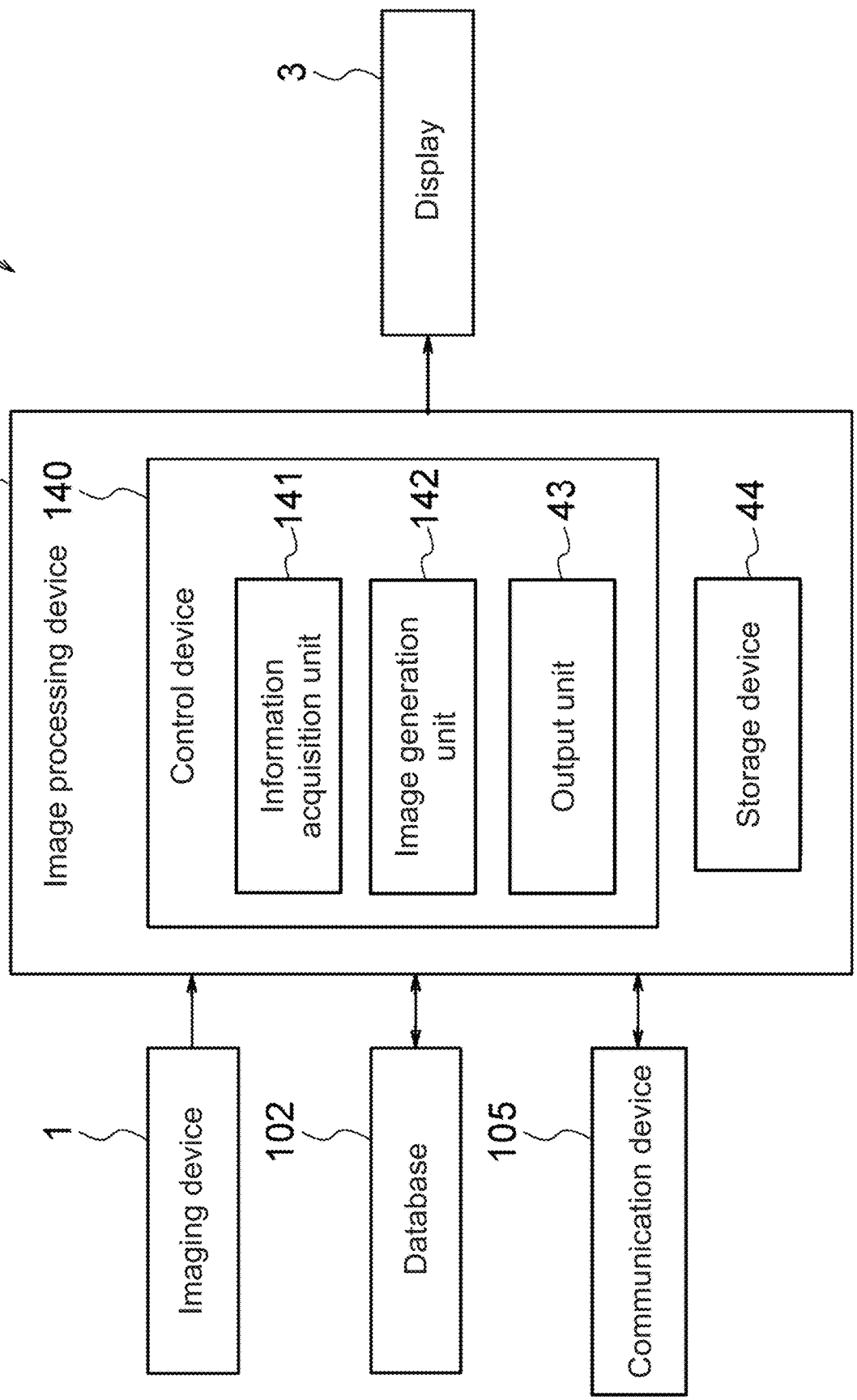
FIG. 12 is a block diagram illustrating an example of the image display system including an image processing device according to a second embodiment.

The image processing device and image processing method according to a second embodiment will now be described. FIG. 12 is a block diagram illustrating an example of an image display system 100 including an image processing device 104 according to the second embodiment. As illustrated in FIG. 12, the image display system 200 in the present embodiment includes an imaging device 1, a database 102, a communication device 105, a display 3, and an image processing device 104. The following description will be made for a configuration different from that of the image display system 200 according to the first embodiment. In FIG. 12, the same reference numerals as those in the first embodiment are attached to the same configurations as those in the first embodiment. The description of these configurations will be omitted, and the description in the first embodiment will be borrowed herein.

The database 102 is a database that stores the image information. In the present embodiment, the database 102 stores images of the forward views from the vehicle in addition to the image of the interior portion of the vehicle.

The database 102 stores an image of the forward view from the vehicle for each scene in which the vehicle travels (referred to as a travel scene of the vehicle). The database 102 preliminarily stores a plurality of images in which the forward views from the vehicle are captured. The travel scene of the vehicle varies, for example, depending on the time slot, weather, and place. Examples of the time slot include four types of morning, noon, sunset, and night. Examples of the weather include three types of sunny, rainy, and cloudy weathers. Examples of the place include two types of urban areas and suburbs. The database 102 stores an image of the forward view from the vehicle corresponding to each combination of the time slot, weather, and place. In the case of the above example, the database 102 stores 24 types of images.

Several types are exemplified as examples of the time slot, weather, and place types, but the number of types is not particularly limited. For example, in the case of "place," it may be finely classified in accordance with the shape of a road, such as a straight road, a curved road, an uphill, a downhill, and an intersection.

The communication device 105 is a communication device that can communicate with a server provided outside the vehicle via a predetermined network. Commands are input to the communication device 105 from the image processing device 104. The communication device 105 acquires information from the server in response to a command from the image processing device 104 and outputs the information acquired from the server to the image processing device 104.

In the present embodiment, the information which the communication device 105 acquires from the server is image information. The server is, for example, a server that stores an image of the forward view from the vehicle for each vehicle type. Additionally or alternatively, the server is, for example, a server that stores an image of the forward view from the vehicle for each travel scene of the vehicle as exemplified in the description of the database 102. For example, the communication device 105 acquires an image of the forward view from the vehicle for the vehicle type and travel scene specified by the image processing device 104. The communication device 105 outputs to the image processing device 104 the acquired image of the forward view from the vehicle. Examples of the communication device 105 include a device having a mobile communication function of 4G LTE and a device having a Wifi communication function.

The image processing device 104 according to the present embodiment has the same configuration as that of the image processing device 4 according to the first embodiment except that an information acquisition unit 141 and an image generation unit 142 included in the control device 140 are different. The description of the configurations with the same reference numerals as those of the configurations of the first embodiment will be omitted, and the description in the first embodiment will be borrowed herein.

The information acquisition unit 141 according to the present embodiment acquires from the database 102 an image of the forward view from the vehicle in addition to the image, in which the forward view from the vehicle is captured, as the outside information. The information acquisition unit 141 also acquires from the server an image of the forward view from the vehicle as the outside information. For example, the information acquisition unit 141 specifies the current travel scene of the vehicle as a condition and acquires images of the forward views from a plurality of vehicles corresponding to the specified condition. In this case, the information acquisition unit 141 acquires not only one or more images that completely match all the conditions but also one or more image that match a part of the conditions.

The image generation unit 142 according to the present embodiment has the same functions as those of the image generation unit 42 according to the first embodiment except that the method for generating the first image is different. Therefore, the description of the same functions as those for the first image will be omitted, and the description in the first embodiment will be borrowed herein.

A method of generating the first image by the image generation unit 142 will be described. In the present embodiment, the image generation unit 142 selects, based on the outside information, the first image from among the images of the forward views from the plurality of vehicles acquired by the information acquisition unit 141. The image generation unit 142 selects, as the first image, an image in which the difference in color information with respect to the forward view from the vehicle is within a predetermined range from among a plurality of image candidates that are preliminarily recorded in the database 102 or the server.

For example, the image generation unit 142 calculates an average value of the numerical data indicating colors for the entire captured images captured by the imaging device 1. The image generation unit 142 also calculates an average value of the numerical data indicating colors for the entire images of the forward views from the vehicles acquired by the information acquisition unit 141. The image generation unit 142 compares the two calculated average values and calculates the difference in the numerical data indicating the colors. The image generation unit 142 calculates the difference in the numerical data indicating the colors for each image candidate and selects as the first image an image candidate having the smallest difference in the numerical data indicating the colors from among the plurality of image candidates.

Figure 13:
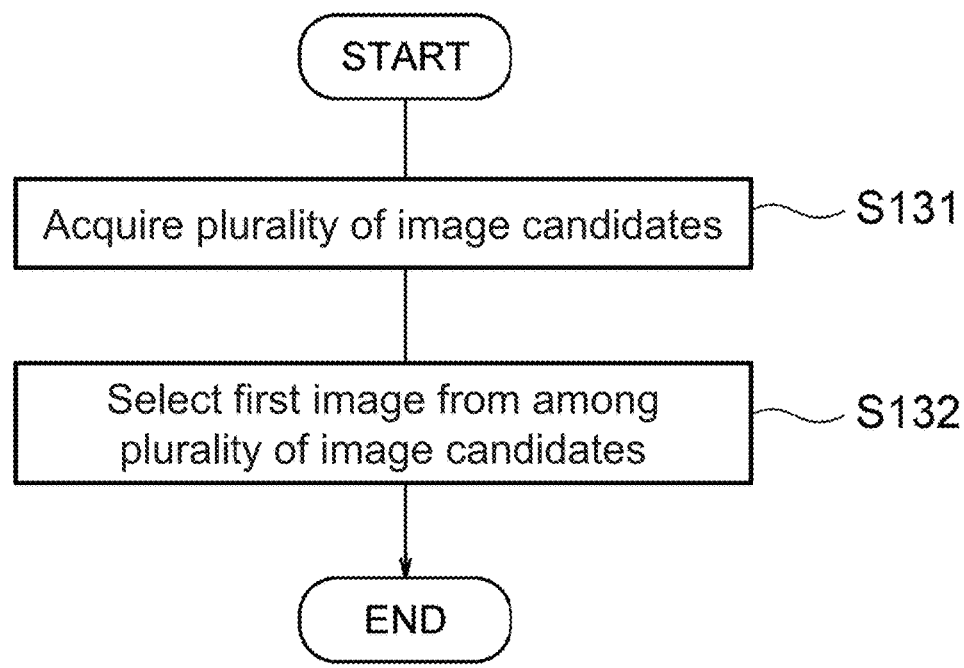
FIG. 13 illustrates a subroutine of step S3 illustrated in FIG. 8.

A process in which the image processing device 104 generates the first image will then be described with reference to FIG. 13. FIG. 13 illustrates a process executed by the image processing device 104, which is a subroutine of step S3 illustrated in FIG. 8. The image processing device 104 executes the same processes as compared with the first embodiment except that the process of step S3 is different. Therefore, the description of the same processes as those of the first embodiment will be omitted, and the description in the first embodiment will be borrowed herein.

In step S131, the image processing device 104 acquires a plurality of image candidates. For example, the image processing device 104 acquires from the database 102 a plurality of images in which the forward views from the vehicle are captured. In this operation, the image processing device 104 acquires a plurality of images that are relatively close to the travel scene of the vehicle. The image processing device 104 also acquires a plurality of images, in which the forward views from the vehicle are captured, from the server via the communication device 105.

In step S132, the image processing device 104 selects, based on the outside information including the color information of the outside of the vehicle, the first image from among the plurality of image candidates acquired in step S31. For example, the image processing device 104 selects as the first image an image candidate in which the difference in color information with respect to the outside of the vehicle is within a predetermined range. The predetermined range is a range for indicating that there is little difference in color with respect to the outside of the vehicle, and this range is preliminarily determined.

When the process in step S132 is completed, the process exits the subroutine illustrated in FIG. 13 and proceeds to step S4 illustrated in FIG. 8.

As described above, in the image processing device 104 according to the present embodiment, the image acquisition unit 141 acquires a plurality of candidate images that are candidates for the first image, and the image generation unit 142 selects the first image from among the plurality of candidate images based on the outside information. Through this operation, an image that is preliminarily stored in the database 102 or the server can be used as the first image, and the processing treatment for the captured image can be reduced as compared with the case in which the first image is generated from the captured image. As a result, the calculation load on the control device 140 due to the image processing can be reduced.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the program executed by the control device 40 has been described by exemplifying a program stored in the storage device 44 which serves as a ROM, but the storage location of the program may be outside the image processing device 4. For example, the program executed by the control device 40 may be stored in a recording medium that can be read by a computer. In this case, by connecting the recording medium and the image processing device 4 using some method/standard, the control device 40 can execute the program recorded on the recording medium.

Moreover, for example, the above first embodiment has been described by exemplifying a process in which the image gradually becomes black as the gradation process performed by the image processing device 4, but the color in the gradation process is not particularly limited. For example, the image processing device 4 may perform a process of applying the vertical and/or horizontal gradation to the first and second images so that they gradually become white.

Moreover, for example, the above first embodiment has been described by exemplifying a case in which the image processing device 4 applies the vertical and horizontal gradation to the first and second images in order that an occupant is easily under an illusion so as to feel the depth, but the present invention is not limited to this. For example, the image processing device 4 may perform other processing treatment in order that an occupant is easily under an illusion so as to feel the depth.

Moreover, for example, the above second embodiment has been described by exemplifying a configuration in which the vehicle includes the database 102, but the database 102 may be provided outside the vehicle. In this case, the image processing device 104 accesses the database 102 via the communication device 105 and acquires a plurality of image candidates.

Moreover, for example, the above second embodiment has been described by exemplifying a configuration in which the image processing device 104 acquires a plurality of image candidates from the database 102 and the server, but the image processing device 104 may acquire a plurality of image candidates from any one of the database 102 and the server.

Moreover, for example, the above second embodiment has been described by exemplifying a case in which the database 102 stores the image of the forward view from the vehicle for each travel scene of the vehicle, but elements constituting the travel scene of the vehicle are not limited to the time slot, weather, and place. The elements constituting the travel scene of the vehicle may be other elements. For example, examples of the other elements constituting the travel scene of the vehicle include whether or not there is a preceding vehicle. Examples of the other elements further include the number of lanes in which vehicles travel.

Moreover, for example, the shape of the display 3 may be different from the shape exemplified in the present embodiments. For example, the shape of the display 3 may be a vertically long rectangular shape. Furthermore, for example, the shape of the display 3 may be a horizontally long rectangular shape that is long in the vehicle width direction so as to extend between a pair of right and left A pillars (or in the vicinities thereof). When the display 3 has a shape that is long in the vehicle width direction, an occupant of the vehicle V is usually more likely to feel the presence of the display more excessively than the display 3 according to the present embodiments. Therefore, when the display 3 has a shape that is long in the vehicle width direction, the effect obtained by adopting the image processing device 4, 104 is further enhanced.

Moreover, for example, the display 3 may be provided along the upper end of the window 14 of the vehicle V. In other words, the display 3 may be provided in parallel with the window 14 so as to be aligned with the height of the upper end of the window 14. For example, the display 3 may be provided at a height at which the height of the lower end of the display 3 and the height of the upper end of the window 14 match (approximately match) each other. In this case, when the driver visually recognizes the scenery ahead of the vehicle V through the window 14, the display 3 can be reliably prevented from interfering with the driver's field of view regardless of the height of the driver's eyes. Alternatively, the display 3 may be provided at a height at which the upper end of the window 14 is positioned between the upper and lower ends of the display 3. In this case, in the driver's field of view, the lower end of the window 14 and the upper end of the display 3 are visually recognized at close positions, and the driver is easily under an illusion as if the window 14 and the display 3 are continuous.

DESCRIPTION OF REFERENCE NUMERALS

1 Imaging device
2 Database
3 Display
4 Image processing device
    40 Control device
        41 Information acquisition unit
        42 Image generation unit
        43 Output unit
    44 Storage device
100 Image display system

The invention claimed is:

1. An image processing device comprising:
    an information acquisition unit configured to acquire, from a captured image that is captured by an imaging device and in which a forward view from a vehicle is captured, color information of the forward view from the vehicle;
    an image generation unit configured to perform processing treatment on the captured image based on the color information thereby to generate a first image blurred in the forward view such that a difference between the color information of the forward view from the vehicle and target image information regarding one or more colors of the first image is reduced to be within a predetermined range; and
    an output unit configured to output the first image to a display provided in a cabin of the vehicle.

2. The image processing device according to claim 1, wherein the first image is displayed in a first area that is a part of a display area of the display.

3. The image processing device according to claim 2, wherein
    the display is configured such that a part of the display area extends in a direction from an interior portion of the vehicle to a windshield of the vehicle, and
    the first area is positioned on a windshield side.

4. The image processing device according to claim 3, wherein the display is provided in a place in which the first area is included in a visual field of a driver of the vehicle when the driver visually recognizes the forward view through the windshield.

5. The image processing device according to claim 1, wherein the display is provided ahead of a driver of the vehicle.

6. The image processing device according to claim 1, wherein the processing treatment is a process of blurring the captured image based on the color information such that the difference between the color information of the forward view from the vehicle and the target image information regarding the one or more colors of the first image is within the predetermined range.

7. The image processing device according to claim 1, wherein
    the information acquisition unit sequentially acquires the color information from the captured image at a first cycle,
    the image generation unit performs the processing treatment on the captured image at a second cycle to generate a plurality of candidate images, where the first image is selected from the plurality of candidate images, and the acquisition of color information during the first cycle corresponds to a timing at which the image generation unit performs the processing treatment during the second cycle.

8. The image processing device according to claim 2, wherein the image generation unit generates, from images stored in a database, a second image displayed in a second area of the display area that is different from the first area, and the output unit outputs the second image to the display.

9. The image processing device according to claim 8, wherein the display is configured such that a part of the display area extends in a direction from an interior portion of the vehicle to a windshield of the vehicle, and the second area is positioned on an interior portion side as compared with the first area.

10. The image processing device according to claim 9, wherein the display is provided in a place in which the second area is included in a visual field of a driver of the vehicle when the driver visually recognizes the forward view through the windshield.

11. The image processing device according to claim 9, wherein the second image is an image acquired from the database that represents a surface of the interior portion.

12. The image processing device according to claim 9, wherein the display is a display in which the display area has a rectangular shape, the image generation unit performs a process of applying gradation to the first image and the second image so that they gradually become a predetermined color from an end portion on the windshield side and an end portion on the interior portion side of the display area toward a boundary between the first area and the second area, and the output unit outputs the first image and the second image subjected to the gradation process to the display.

13. The image processing device according to claim 9, wherein the image generation unit performs the process of applying gradation to the first image and the second image so that they gradually become the predetermined color from end portions other than the end portion on the windshield side and the end portion on the interior portion side in the display area toward a boundary between the first area and the second area.

14. The image processing device according to claim 8, wherein the image generation unit superposes content information on the first image and the second image thereby to generate a display image to be displayed in the display area, the content information being information to be provided to a driver of the vehicle, and the output unit outputs the display image to the display.

15. An image processing method executed by a computer, comprising:

acquiring, from a captured image that is captured by an imaging device and in which a forward view from a vehicle is captured, color information of the forward view from the vehicle;

performing processing treatment on the captured image based on the color information thereby to generate a first image blurred in the forward view such that a difference between the color information of the forward view from the vehicle and target image information regarding one or more colors of the first image is reduced to be within a predetermined range; and outputting the first image to a display provided in a cabin of the vehicle.

16. A computer-readable medium storing a non-transitory program for causing a computer executing the program to perform as an image processing device comprising:

an information acquisition unit configured to acquire, from a captured image that is captured by an imaging device and in which a forward view from a vehicle is captured, color information of the forward view from the vehicle;

an image generation unit configured to perform processing treatment on the captured image based on the color information thereby to generate a first image blurred in the forward view such that a difference between the color information of the forward view from the vehicle and target image information regarding one or more colors of the first image is reduced to be within a predetermined range; and an output unit configured to output the first image to a display provided in a cabin of the vehicle.

17. An image processing device comprising:

a camera that acquires a captured image in a forward view from a vehicle;

a storage device for storing programs, captured image data acquired by the camera, and target image information;

a processor that executes a program stored in the storage device to perform as:

an information acquisition unit configured to acquire, from the captured image, color information of the forward view from the vehicle;

an image generation unit configured to perform processing treatment on the captured image based on the color information thereby to generate a first image blurred in the forward view such that a difference between the color information of the forward view from the vehicle and target image information regarding one or more colors of the first image is reduced to be within a predetermined range; and an output unit configured to output the first image to a display provided in a cabin of the vehicle.

\* \* \* \* \*